(12) United States Patent
Kanai et al.

(10) Patent No.: US 10,189,112 B2
(45) Date of Patent: Jan. 29, 2019

(54) WELDING EQUIPMENT FOR METALLIC MATERIALS AND METHOD FOR WELDING METALLIC MATERIALS

(71) Applicants: Takahiko Kanai, Kanagawa (JP); Munehisa Hatta, Kanagawa (JP); Fumiaki Ikuta, Kanagawa (JP); Kazuhiro Kawasaki, Kanagawa (JP); Eizaburo Nakanishi, Kanagawa (JP); Tsuyoshi Yoshida, Kanagawa (JP); Kotobu Nagai, Ibaraki (JP); Masao Hayakawa, Ibaraki (JP); Takehiko Itagaki, Ibaraki (JP)

(72) Inventors: Takahiko Kanai, Kanagawa (JP); Munehisa Hatta, Kanagawa (JP); Fumiaki Ikuta, Kanagawa (JP); Kazuhiro Kawasaki, Kanagawa (JP); Eizaburo Nakanishi, Kanagawa (JP); Tsuyoshi Yoshida, Kanagawa (JP); Kotobu Nagai, Ibaraki (JP); Masao Hayakawa, Ibaraki (JP); Takehiko Itagaki, Ibaraki (JP)

(73) Assignees: NETUREN CO., LTD., Tokyo (JP); NATIONAL INSTITUTE FOR MATERIALS SCIENCE, Ibaraki (JP)

(*) Notice: Subject to any disclaimer, the term of this patent is extended or adjusted under 35 U.S.C. 154(b) by 620 days.

(21) Appl. No.: 14/738,364

(22) Filed: Jun. 12, 2015

(65) Prior Publication Data
US 2015/0306696 A1 Oct. 29, 2015

Related U.S. Application Data

(62) Division of application No. 13/121,408, filed as application No. PCT/JP2009/067032 on Sep. 30, 2009, now Pat. No. 9,079,266.

(30) Foreign Application Priority Data

Sep. 30, 2008 (JP) .................................. 2008-255776
Sep. 30, 2008 (JP) .................................. 2008-255777

(51) Int. Cl.
*B23K 11/11* (2006.01)
*B23K 11/24* (2006.01)
(Continued)

(52) U.S. Cl.
CPC ............. *B23K 11/115* (2013.01); *B23K 11/24* (2013.01); *B23K 11/241* (2013.01); *B23K 11/26* (2013.01);
(Continued)

(58) Field of Classification Search
CPC .............................. B23K 11/115; B23K 11/24
(Continued)

(56) References Cited

U.S. PATENT DOCUMENTS 1,933,045 A 10/1933 Caputo
2,021,477 A * 11/1935 Bohn .................... B23K 11/166
219/108
(Continued)

FOREIGN PATENT DOCUMENTS

JP 50-104742 A 8/1975
JP 62-24877 A 2/1987
(Continued)

OTHER PUBLICATIONS

Japan Welding Society, "Welding/joining guidebook," Sep. 30, 1990, pp. 392-398, Maruzen, Tokyo, Japan.
(Continued)

*Primary Examiner* — Dana Ross
*Assistant Examiner* — Lawrence Samuels
(74) *Attorney, Agent, or Firm* — Chen Yoshimura LLP

(57) ABSTRACT

A welding equipment for metallic materials capable of performing heat treatment such as tempering based on (Continued)

partial heating in spot welding is provided. The welding equipment sandwiches metallic materials with a pair of electrodes, and heats different regions of the metallic materials by energization, with the pair of electrodes maintained at the same position with respect to the metallic materials. The welding equipment includes a first heating means connected to the pair of electrodes for heating and welding the internal region of the circle defined by projecting the cross-sectional area of the axis of the electrodes on the metallic materials by applying power having a low first frequency, a second heating means for heating a ring-shaped region along the circle by applying power having a second frequency that is higher than the first frequency, and an energization control unit for independently controlling the first and the second heating means.

12 Claims, 17 Drawing Sheets

(51) Int. Cl.
  *B23K 11/26* (2006.01)
  *B23K 11/31* (2006.01)
  *B23K 13/08* (2006.01)
  B23K 101/18 (2006.01)
  B23K 103/04 (2006.01)

(52) U.S. Cl.
  CPC ............ *B23K 11/312* (2013.01); *B23K 13/08* (2013.01); *B23K 2101/18* (2018.08); *B23K 2103/04* (2018.08)

(58) Field of Classification Search
  USPC ................ 219/660, 91.22, 86.1, 91.2, 117.1, 219/108–110, 137 PS
  See application file for complete search history.

(56) References Cited

U.S. PATENT DOCUMENTS

| | | | |
|---|---|---|---|
| 2,233,526 A | 3/1941 | Hagedorn et al. | |
| 2,262,705 A * | 11/1941 | Tuttle | B23K 11/16 148/524 |
| 2,287,544 A | 6/1942 | Vang | |
| 2,301,424 A | 11/1942 | List et al. | |
| 2,609,482 A | 9/1952 | Young | |
| 2,969,453 A | 1/1961 | Page | |
| 3,245,408 A | 4/1966 | Gonser | |
| 3,249,735 A | 5/1966 | Needham | |
| 3,410,983 A | 11/1968 | Deutsch et al. | |
| 3,492,512 A | 1/1970 | Eckl | |
| 3,538,301 A | 11/1970 | Bray et al. | |
| 3,575,572 A | 4/1971 | Levinge | |
| 3,576,422 A | 4/1971 | Beaupre et al. | |
| 3,739,139 A | 6/1973 | Weman | |
| 4,025,864 A | 5/1977 | Kennedy | |
| RE31,581 E | 5/1984 | Richter | |
| 4,578,553 A | 3/1986 | Yamashita et al. | |
| 4,751,367 A | 6/1988 | Simm | |
| 4,785,149 A | 11/1988 | Gilliland | |
| 4,804,819 A * | 2/1989 | Farrow | B23K 11/06 219/601 |
| 5,229,567 A | 7/1993 | Kobayashi et al. | |
| 5,315,089 A | 5/1994 | Hughes et al. | |
| 5,591,993 A | 1/1997 | Nomura et al. | |
| 5,889,262 A | 3/1999 | Oh et al. | |
| 6,107,595 A * | 8/2000 | Peterson | B23K 11/11 219/117.1 |
| 6,207,929 B1 | 3/2001 | Stava et al. | |
| 6,321,167 B1 | 11/2001 | Jochi et al. | |
| 6,472,634 B1 | 10/2002 | Houston et al. | |
| 6,515,259 B1 | 2/2003 | Hsu et al. | |
| 6,940,040 B2 | 9/2005 | Houston et al. | |
| 6,982,397 B2 | 1/2006 | Yamada et al. | |
| 7,087,854 B2 * | 8/2006 | Takahashi | B23K 11/115 219/91.22 |
| 7,148,449 B2 | 12/2006 | Myers et al. | |
| 7,166,818 B2 | 1/2007 | Stava et al. | |
| 7,183,516 B2 | 2/2007 | Blankenship et al. | |
| 7,618,503 B2 * | 11/2009 | McCrink | C21D 1/42 148/605 |
| 8,207,798 B1 | 6/2012 | Wright | |
| 8,237,088 B2 | 8/2012 | Yokota et al. | |
| 2001/0000899 A1 | 5/2001 | Stava et al. | |
| 2001/0023857 A1 | 9/2001 | Watanabe | |
| 2002/0134763 A1 | 9/2002 | Merek et al. | |
| 2003/0071034 A1 | 4/2003 | Thompson et al. | |
| 2004/0026391 A1 | 2/2004 | Oberzaucher et al. | |
| 2005/0035105 A1 | 2/2005 | Spear et al. | |
| 2005/0051525 A1 | 3/2005 | Yamada et al. | |
| 2005/0167402 A1 * | 8/2005 | Takahashi | B23K 11/115 219/91.22 |
| 2005/0173419 A1 | 8/2005 | Miller | |
| 2006/0076333 A1 | 4/2006 | Stava et al. | |
| 2006/0131290 A1 | 6/2006 | Stava | |
| 2007/0269678 A1 * | 11/2007 | Ono | B23K 11/16 428/659 |
| 2008/0061045 A1 | 3/2008 | Eldridge | |
| 2008/0115863 A1 * | 5/2008 | McCrink | C21D 1/42 148/521 |
| 2008/0190906 A1 | 8/2008 | Aigner | |
| 2008/0203139 A1 * | 8/2008 | McCrink | B23K 5/12 228/158 |
| 2012/0141829 A1 * | 6/2012 | Oikawa | B23K 11/115 428/683 |

FOREIGN PATENT DOCUMENTS

| | | |
|---|---|---|
| JP | 9-271962 A | 10/1997 |
| JP | 2001-105155 A | 4/2001 |
| JP | 2002-321068 A | 11/2002 |
| JP | 2005-169429 A | 6/2005 |
| JP | 2005-211934 A | 8/2005 |

OTHER PUBLICATIONS

International Search Report (ISR) issued PCT/JP2009/067032 (International application) dated Jan. 2010 for Examiner consideration.
Written Opinion (PCT/ISA/237) issued in PCT/JP2009/067032 (International application) dated Jan. 2010.

* cited by examiner

WELDING EQUIPMENT FOR METALLIC MATERIALS AND METHOD FOR WELDING METALLIC MATERIALS

This application is a divisional of a pending application, application Ser. No. 13/121,408 filed on Jun. 16, 2011, which is the National Stage Application of PCT International Application No. PCT/JP2009/067032, both of which are hereby incorporated by reference in their entireties.

TECHNICAL FIELD

The present invention relates to welding equipment for metallic materials and a method for welding metallic materials. More specifically, the invention relates to the welding equipment that forms a nugget in a metallic work using electric power from a power source for spot welding and heats the work with electric power from a high-frequency power source, and a method for welding metallic materials.

BACKGROUND ART

Spot-welding equipment is used to weld steel plates kept in contact with each other. FIG. 24 is a cross-sectional view illustrating the spot welding of steel plates 50. As shown in FIG. 24, spot-welding of the steel plates 50 is performed by sandwiching the plates contacting each other with a pair of electrodes 52, and by applying a given force to the electrodes 52 in the direction of the arrow to pressurize the steel plates 50.

A large current on the order of kA is then fed to the electrodes 52 while the pressurized state is maintained to melt the compressed portion of the steel plates 50 instantaneously by Joule heat, thus forming a molten body of a given diameter called nugget 54 (non-patent literature 1).

By the way, as automotive materials, ultra-high-tension steel plates have recently been used extensively for the spot welding in vehicle production lines to reduce weight of vehicles and ensure safety at the same time.

FIGS. 25A and 25B are plan views of samples used for a tensile test for measuring the spot-weld strength of high-tension steel plates. FIG. 25A is a superposed joint sample, and FIG. 25B is a cross joint sample. With the superposed joint sample shown in FIG. 25A, the two rectangular steel plates 50 are made to contact each other and spot-welded at the ends in the longitudinal direction. With the cross joint sample shown in FIG. 25B, two rectangular steel plates 50 are made to cross in a cross shape, and the intersection is spot-welded. A nugget 54 formed by welding is shown in an ellipse enclosed with a dotted line, and the arrows show the direction of force 56 applied in the tensile test.

It has been reported that in spot welding of high-tension steel plates, the tensile strength of a superposed joint increases as the strength of the joint material increases, but that the peel strength of a cross joint does not increase with the improvement of material strength, meaning that it is difficult to obtain stable strength. The reason why stable tensile strength cannot be obtained under the peeling load applied to the cross joint is assumed to be simultaneous occurrence of the following two phenomena: the degree of stress concentration on the circumference of the nugget 54 becomes extremely high, and the binding force around the nugget 54 increases with the increase in strength of the parent metal. Under such circumstances, to ensure the toughness of the weld region of high-tension steel plates for actual vehicle bodies, compositional control is performed at present. For example, the amount of carbon is maintained at a certain level or lower to prevent the weld region from becoming too hard.

Meanwhile, since the use of high-tension steel plates is an efficient way to reduce the weight of vehicle bodies, high-tension steel plates with enhanced strength and ductility are much anticipated. By further improving the strength of steel plates for vehicles, further reduction in weight is expected. By improving the ductility of steel plates for vehicles, press-molding performance can be improved and sufficient deformability at possible collision in the state of products are ensured. Normally, the higher the strength of steel plates for vehicles, the lower the ductility. To improve the strength and ductility of steel plates for vehicles at the same time, it is effective to increase the carbon content in the material. In this case, however, the spot-weld region becomes extremely hard and brittle, and thus it is difficult to obtain desired strength stably.

Various efforts have been made to ensure higher strength of spot-weld regions by improving welding methods. For example, post-energization for tempering is attempted after a weld joint is formed in a given size. However, with the resistance spot welding performed in vehicle assembly, the process time per stroke must be kept within one second. Consequently, if tempering is performed by post-energization using existing welding equipment, the effect of tempering becomes minimal. Or, to obtain sufficient effect of tempering, the time for tempering far exceeds the specified process time. This problem is derived from the basic problem of resistance welding that efficient heating cannot be caused in a short time because the current density of the welded region decreases as the energized area increases after the formation of a nugget 54.

Patent literature 1 discloses spot welding equipment having a spot welder and a high-frequency induction heating means to improve the fatigue strength of the spot-welded region of high-tension steel plates. This high-frequency induction heating means includes a heating coil for heating the portion of the work to be welded by induction heating and a high-frequency power source for supplying high-frequency power to the heating coil.

CITATION LIST

Patent Literature

Patent literature 1: JP2005-211934A

Non-Patent Literature

Non-patent literature 1: Japan Welding Society, "Welding/jointing guidebook," MARUZEN, Sep. 30, 1990, pp. 392-398

SUMMARY OF THE INVENTION

Technical Problem

With the device for heating and welding metallic materials sandwiched by a pair of electrodes, heating is performed, focusing only on the apex at the center of the electrodes, and consequently the temperature profile remains simple. For example, with the spot welding equipment disclosed in patent literature 1, space for installing a heating coil for heating the region of the work to be welded by induction heating is necessary. However, since the area around the electrodes of the spot welding equipment is very narrow, it is difficult to separately install a new heating means. In other words, the heating coil is larger than the diameter of the electrodes of the spot welder. Consequently, it is impossible to heat only the outer periphery of the nugget 54, which requires re-heating most.

In view of the above, one of the purposes of the present invention is to provide welding equipment for metallic materials capable of performing heat treatment, such as tempering based on partial temperature increase, in spot welding. Another purpose of the present invention is to provide a welding method for preheating metallic materials and heat-treating the outer peripheral region of nuggets in a short time.

Solution to Problem

To achieve the above objectives, the welding equipment for metallic materials of the present invention sandwiches metallic materials with a pair of electrodes, and heats different regions of the metallic materials by energization, with the pair of electrodes maintained at the same position, wherein the device includes a first heating means, which is connected to the pair of electrodes, for heating a given region of the metallic materials by applying electric power having a first frequency, a second heating means, which is connected to the pair of electrodes, for heating a region of the metallic materials different from the above region by applying electric power having a second frequency, and an energization control unit for controlling the first heating means and the second heating means independently from each other.

In the above configuration, the inside of the given region of the metallic material may be heated by the first heating means, the area in proximity to the given region of the metallic material may be heated by the second heating means, and the heating by the first heating means and that by the second heating means may be controlled independently from each other by the energization control unit.

The first heating means may heat the inside of a region defined by projecting the cross-sectional area of the axis of the electrodes on the metallic materials, the second heating means may heat the ring-shaped region along the circumference of the region defined by projecting the cross-sectional area of the axis of the electrodes described above, and the heating by the first heating means and that by the second heating means may be controlled by the energization control unit independently from each other.

The first frequency may be made lower than the second frequency, and the internal area of the circle may be welded by applying power having the first frequency to the metallic materials. The second frequency may be made higher than the first frequency, and the ring-shaped region may be heated by resistance heating, or by both resistance heating and high-frequency induction heating, by applying power having the second frequency to the metallic materials.

To achieve the above objectives, the welding equipment for metallic materials of the present invention includes a pair of electrodes, a welding power source for supplying power for welding to the pair of electrodes, and a high-frequency power source for supplying high-frequency power to the pair of electrodes, wherein the welding power source and the high-frequency power source are connected to the pair of electrodes in parallel respectively, an inductance for blocking current is connected between the high-frequency power source and the pair of electrodes, a capacitor for blocking current is connected between the high-frequency power source and the pair of electrodes, the inductance blocks the high-frequency current supplied from the high-frequency power source to the pair of electrodes so as not to flow into the welding power source, and the capacitor blocks the current supplied from the welding power source to the pair of electrodes so as not to flow into the high-frequency power source. As the inductance for blocking current, a gun-arm floating inductance may be used.

According to the above configuration, welding equipment having a spot-welding power source connected to a pair of electrodes via an inductance for blocking current and a high-frequency power source connected to the pair of electrodes via a capacitor for blocking current, and capable of supplying power from the spot-welding power source and from the high-frequency power source respectively can be obtained. High-frequency voltage can thus be applied via the pair of electrodes for spot-welding, and the metallic materials can be heated by direct energization of the outer periphery of the electrodes.

Furthermore, the welding equipment for metallic materials may be equipped with a gun arm, and the spot welding power source and the high-frequency power source may be connected to the pair of electrodes via the gun arm. The welding power source and the high-frequency power source may be equipped with an energization control unit for controlling output time and output current. The welding power source may be a low-frequency power source. The low-frequency power source may be connected to the pair of electrode via a transformer, and a bypass capacitor may be connected to the winding of the transformer on the side of the pair of electrodes in parallel.

The welding power source may be a DC power source. The capacitor for blocking current and the inductance for blocking current may constitute a DC series resonant circuit. The inductance for blocking current and the capacitor for parallel resonance to be connected at the top and the bottom of the gun arm may constitute a parallel resonance circuit. The floating inductance of the gun arm may be used as the inductance for blocking current. The high-frequency power source may supply power directly to the electrodes via the capacitor for blocking current, or power may be supplied from the base of the gun arm.

According to the above configuration, spot welding can be performed in accordance with the quality of metallic materials, and the outer periphery of a nugget formed by the spot welding of the metallic materials can be heated directly using the high-frequency power source efficiently and in a short time.

To achieve the above objectives, the method for welding metallic materials according to the present invention sandwiches metallic materials with a pair of electrodes and welds the metallic materials by energizing and heating the materials. The method includes a first step of heating a given region of the metallic material by a first energization of the pair of electrodes, and a second step of heating a region different from the region heated in the first step by a second energization of the pair of electrodes, with the pair of electrodes sandwiching the metallic materials maintained at the same position, wherein the heating time of the first step and that of the second step are controlled independently from each other.

In the first step described above, the first heating means may heat the inside of the given region of the metallic materials, and in the second step, the second heating means may heat the proximity of the given region of the metallic materials, and welding may thus be performed so as to control the heating by the first and the second heating means independently from each other.

The region to be heated by the first heating means may be the inside of a circle defined by projecting the cross-sectional area of the axis of the electrodes on the metallic materials, the region to be heated by the second heating means may be a ring-shaped near-field region along the circle defined by projecting the cross-sectional area of the axis of the electrodes on the metallic materials, and the heating by the first and the second heating means may be controlled independently from each other.

The equipment performs the heating by the second heating means at higher frequency than the heating by the first heating means so that the ring-shaped region can undergo resistance heating, or both resistance heating and high-frequency induction heating. The equipment performs heating by the first heating means at lower frequency than the heating by the second heating means so that the internal region of the circle can be welded.

To achieve the above objectives, the method for welding metallic materials according to the present invention includes a step of sandwiching metallic materials to be welded with a pair of electrodes, and supplying welding power to the pair of electrodes, thus performing spot welding of the metallic materials, and a step of supplying high-frequency power to the pair of electrodes and heating the welded region or a region to be welded of the metallic materials.

Specifically, the method for welding metallic materials according to the present invention includes a welding step of sandwiching metallic materials to be welded with a pair of electrodes and supplying welding power to the pair of electrodes, thus performing spot welding of the metallic materials, and a step of heating the region of the metallic materials having undergone spot welding by supplying high-frequency power to the pair of electrodes while controlling the supply time and supply volume.

In the welding step, supply of high-frequency power to the pair of electrodes in the heating step may be started before the supply of welding power is completed.

The method for welding metallic materials according to the present invention includes a preheating step of sandwiching metallic materials with a pair of electrodes and supplying high-frequency power to the pair of electrodes, thus preheating the region of the metallic materials to be welded, and a welding step of supplying welding power to the pair of electrodes, thus performing spot welding of the metallic materials.

In the preheating step, the supply of welding power to the pair of electrodes in the welding step may be started before the supply of high-frequency power is completed. Following the welding step, a step of supplying high-frequency power to the pair of electrodes while controlling the supply time and supply volume, may be included to heat the region of the metallic materials having undergone spot welding.

The method for welding metallic materials according to the present invention sandwiches metallic materials to be welded with a pair of electrodes, supplies welding power to the pair of electrodes, and superposes high-frequency power to the pair of electrodes while controlling the supply time and supply volume.

According to the above configuration, welding power and high-frequency power can be supplied to the metallic materials, high-frequency power can be applied to the metallic materials via the pair of electrodes for performing spot welding, and the region around the outer periphery of the electrodes can be energized directly to heat the metallic materials.

Furthermore, spot welding can be performed in accordance with the quality of the metallic materials, and the outer peripheral region of the nugget formed by the spot welding of the metallic materials can be energized and heated directly and efficiently with the high-frequency power in a short time.

Advantageous Effects of Invention

The present invention provides welding equipment of simple configuration, with a high-frequency power source connected to the electrodes of the welding equipment, capable of heating outer periphery of the electrodes using the same electrodes and performing heat treatment of the outer periphery of the nugget formed by spot welding in a short time. Furthermore, by changing the frequency of the high-frequency power source, flexible heating treatment can be performed.

According to the method for welding metallic materials of the present invention, a high-frequency power source can be connected to the electrodes for spot welding, metallic materials can be heated using the electrodes, and preheating of the metallic materials and the heating treatment of the outer peripheral region of the nugget formed by spot welding can be performed in a short time.

BRIEF DESCRIPTION OF DRAWINGS

FIG. 25A is a superposed joint sample, and FIG. 25B is a cross joint sample.

Figure 1:
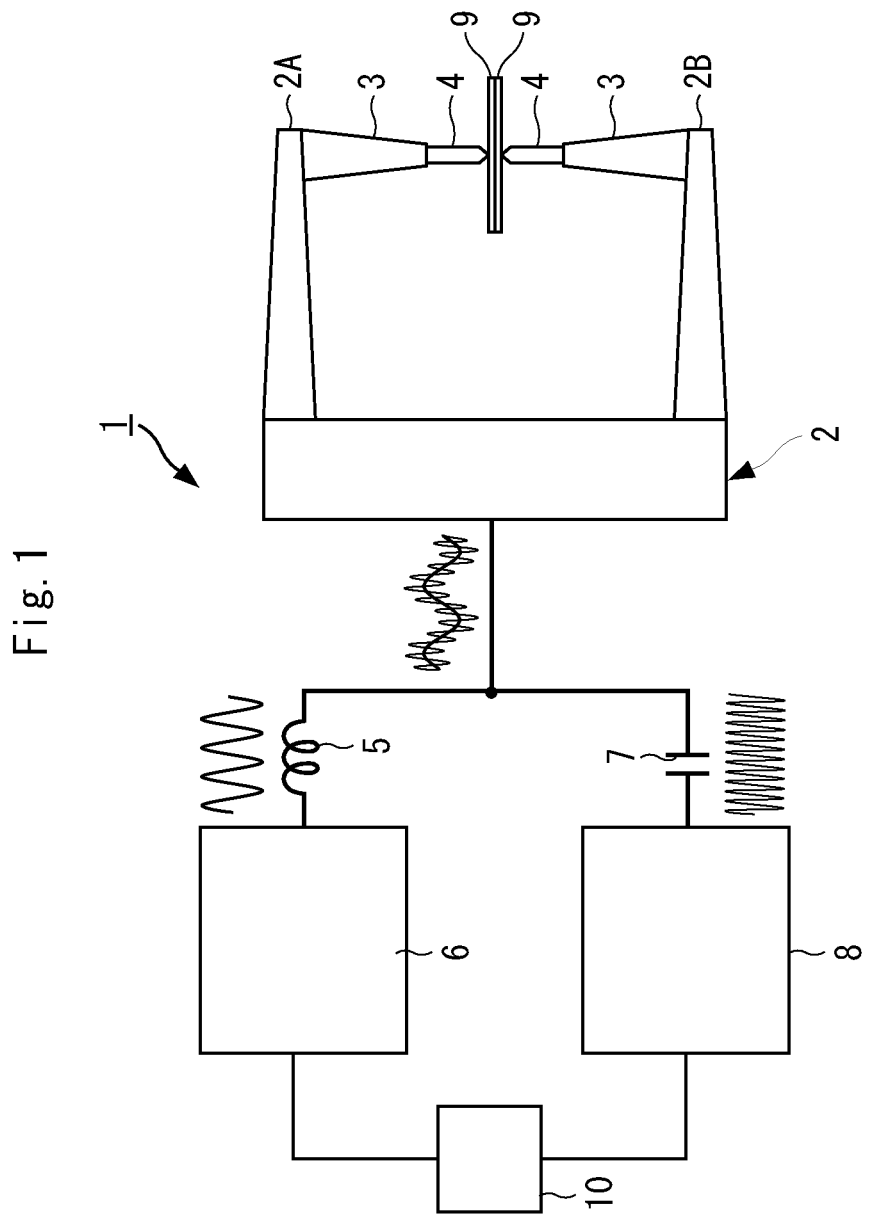
FIG. 1 illustrates a typical configuration of the welding equipment for metallic materials related to an embodiment of the present invention.

REFERENCE SIGNS LIST 1, 25, 30, 35, 40: Welding equipment for metallic materials
1A, 25A, 30A, 35A, 40A: Welding circuit unit of welding equipment
1B, 25B, 30B, 35B, 40B: Welding unit of welding equipment
2: Gun arm
2A: Top portion of gun arm
2B: Top portion of gun arm
3: Electrode support
4: Electrode
5: Floating inductance
6: Low-frequency power source
7: Matching capacitor
8: High-frequency power source
9: Work
9A: Inside the circle
9B: Ring-shaped region
10: Energization control unit
11: Bypass capacitor
12: Commercial power source
13: Inductance for blocking high-frequency current
14: Low-frequency power control unit
16: Welding transformer
18: Oscillator
20: Matching transformer
22: High-frequency current
24: Low-frequency current
26: DC current
36: DC power source

DESCRIPTION OF EMBODIMENTS

The embodiments of the present invention will hereafter be described by referring to the drawings.
(Welding Equipment for Metallic Materials)

FIG. 1 illustrates a typical configuration of welding equipment 1 for metallic materials according to the embodiment of the present invention. The welding equipment for metallic materials 1 includes an electrode arm 2, electrode supports 3 whose one end and the other end are respectively connected to the top portion 2A and the bottom portion 2B of the electrode arm 2, a pair of electrodes 4 connected to the other end of each of the electrode supports 3, a welding power source 6 connected to the electrode arm 2 via an inductance 5, a high-frequency power source 8 connected to the electrode arm 2 via a capacitor 7, and an energization control unit 10 for controlling each output of the welding power source 6 and the high-frequency power source 8.

The welding equipment 1 for metallic materials further includes a fixed base for supporting the electrode arm 2, a drive mechanism for driving the electrode arm 2, and pressing mechanism for pushing out one of the electrodes 4 from the electrode supports 3 (none of them shown). The pressing mechanism is used when the metallic materials 9 to be welded, which will be described later, are energized with the electrodes 4, 4.

The electrode arm 2 has a top portion 2A and a bottom portion 2B connected to the electrodes 4, 4 respectively via each electrode support 3. The electrode arm 2 is also called a gun arm. Since the gun arm 2 shown is in a shape of C, it is called C-type gun arm. In addition to C-type gun arm, X-type gun, etc. are used as well for portable- or robot-type welding equipment. The electrode arm 2 of any shape is applicable. The following description assumes C-type gun arm 2.

The pair of electrodes 4, 4 are facing opposite to each other across a gap, into which two steel plates 9 are inserted as metallic materials 9. The electrodes 4 are made of copper, for example, and in a circular or elliptical shape or in a shape of a rod.

Figure 2:
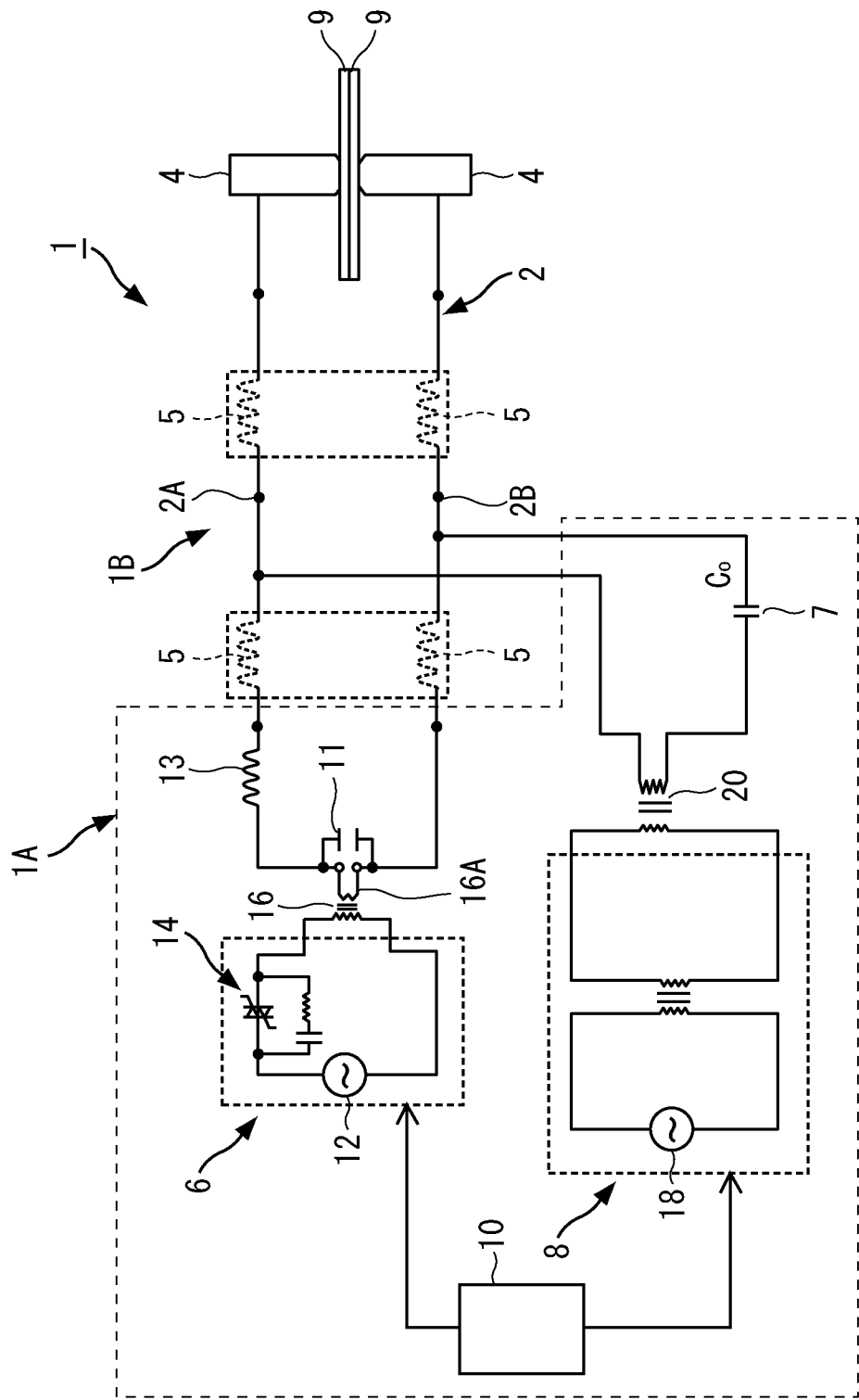
FIG. 2 is an electric circuit diagram of the welding equipment for metallic materials shown in FIG. 1.

FIG. 2 is the electric circuit diagram of the welding equipment 1 for metallic materials shown in FIG. 1. As shown in FIG. 2, the electric circuit of the welding equipment 1 for metallic materials includes a welding circuit 1A enclosed by dotted line and a welding unit 1B. The welding circuit unit 1A includes electric circuits such as welding power source 6, high-frequency power source 8, inductance 5, capacitor 7, and an energization control unit 10 for controlling the output from the welding power source 6 and the high-frequency power source 8. The welding unit 1B, or a circuit electrically connected to the welding circuit unit 1A, includes a gun arm 2, a pair of electrodes 4, 4 electrically connected to the gun arm 2, and metallic materials 9 sandwiched by the pair of electrodes 4, 4.

The welding power source 6 is a low-frequency power source including a commercial power source 12 whose output frequency is 50 or 60 Hz, a low-frequency power source control unit 14 connected to one end of the commercial power source 12, and a welding transformer 16 connected to the other end of the commercial power source 12 and to the output end of the low-frequency power source control unit 14. Both ends of the secondary winding of the welding transformer 16 are connected to the left end of the top portion 2A, and to the left end of the bottom portion 2B, of the C-type gun arm 2 respectively. The low-frequency power source control unit 14 included of a power control semiconductor device, such as thyristor and gate drive circuit, controls the power supplied from the commercial power source 12 to the electrodes 4.

A bypass capacitor 11 is connected to the secondary winding 16A, namely the side of the welding transformer 16 close to the gun arm 2, in parallel. The bypass capacitor 11 has low-capacitive impedance to the frequency of the high-frequency power source 8. Consequently, the high-frequency voltage applied from the high-frequency power source 8 to the secondary winding 16A can be minimized, and high-frequency inductive voltage to the primary side of the welding transformer 16 can be decreased.

The high-frequency power source 8 includes an oscillator 18 and a matching transformer 20 connected to the output end of the oscillator 18. One end of the matching transformer 20 is connected to the top portion 2A of the C-type gun arm. The other end of the matching transformer 20 is connected to the bottom portion 2B of the C-type gun arm 2 via a capacitor 7. The capacitor 7 can also function as a matching capacitor of the DC resonance circuit, which will be described later. The capacity of the capacitor 7 depends on the oscillating frequency of the oscillator 18 and the floating inductance 5 of the C-type gun arm 2. The oscillator 18, which includes an inverter using various transistors, controls the power supplied from the high-frequency power source 8 to the electrodes 4.

As shown in FIG. 2, the route from the C-type gun arm 2 connected to the secondary winding of the welding transformer 16 to the electrodes 4, 4 has inductances 5. As the inductance 5, a floating inductance formed in the C-type gun arm 2 can be used.

If the capacitor 7 also functions as a matching capacitor, a DC resonance circuit may be configured with the matching capacitor 7 and the inductance 5.

(Modification 1 of the Welding Equipment for Metallic Materials)

Figure 3:
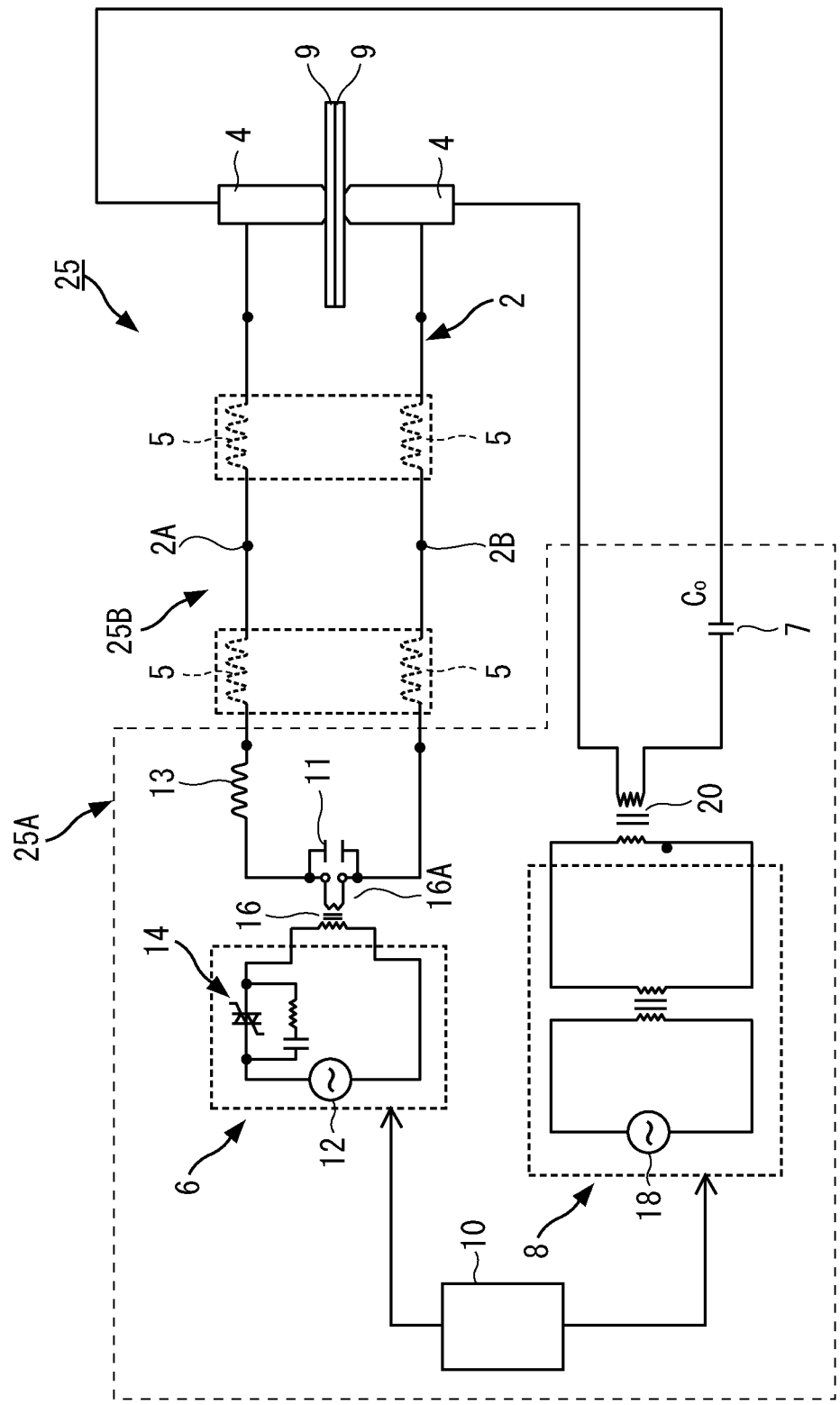
FIG. 3 is an electric circuit diagram of modification 1 of the welding equipment for metallic materials.

FIG. 3 is an electric circuit diagram of modification 1 of the welding equipment 1 for metallic materials. With the electric circuit of the welding equipment 25 for metallic materials shown in FIG. 3, the high-frequency power source 8 is connected directly to a pair of electrodes 4, 4 not via a C-type gun arm 2, whereas with the electric circuit of the welding equipment 1 for metallic materials shown in FIG. 2, the high-frequency power source 8 is connected to the electrodes 4, 4 via the C-type gun arm 2. The high-frequency power source 8 may be connected to the base of the electrodes 4, 4 via the capacitor 7. Since other circuit configurations are the same as those shown in FIG. 2, description is omitted.

(Modification 2 of the Welding Equipment for Metallic Materials)

Figure 4:
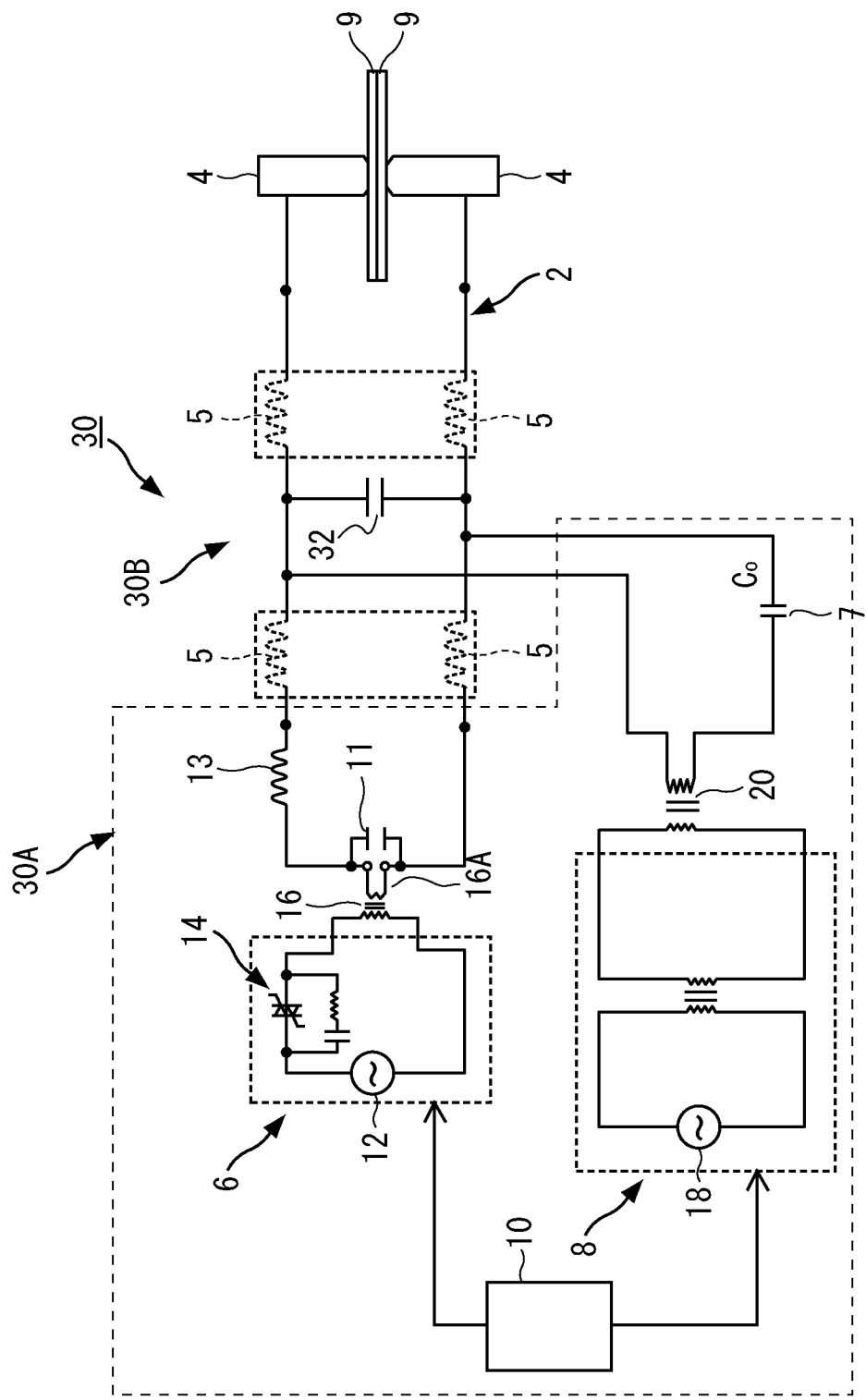
FIG. 4 is an electric circuit diagram of modification 2 of the welding equipment for metallic materials.

FIG. 4 is an electric circuit diagram of modification 2 of the welding equipment for metallic materials. The electric circuit of the welding equipment 30 for metallic materials shown in FIG. 4 differs from the welding equipment 1 for metallic materials shown in FIG. 2 in that a capacitor for parallel resonance 32 is connected between a pair of electrodes 4, 4 in parallel. Namely, the capacitor for parallel resonance 32 is connected to the top portion 2A and the bottom portion 2B of a C-type gun arm 2 in parallel. Consequently, the capacitor for parallel resonance 32 and the inductances 5 constitute a parallel resonance circuit. In this case, the capacitor 7 has the function of blocking the low-frequency current from the low-frequency power source 6. Since other circuit configurations are the same as those shown in FIG. 2, description is omitted.

(Separation of Low-Frequency Power Source 6 and High-Frequency Power Source 8)

The relation between the low-frequency power source 6 and the high-frequency power source 8 is described below.

The inductances 5 and the capacitor 7 are connected between the low-frequency power source 6 and the high-frequency power source 8, and the inductive reactance $X_L$ ($X_L=2\pi f_L L$, where $f_L$ is the frequency of the low-frequency power source 6, and L is the value of the inductance 5) of the inductance 5 (L) is small at low frequency. Meanwhile, the capacitive reactance $X_C$ ($X_C=1/(2\pi f_L C)$) of capacitor 7 (C) is large at low frequency ($f_L$). Consequently, leakage of current from the low-frequency power source 6 to the high-frequency power source 8 can be blocked with the large capacitive reactance $X_C$ of the capacitor 7 at low frequency ($f_L$). Namely, the capacitor 7 functions as a capacitor for blocking low-frequency current.

Of the impedances with the low-frequency power source 6 viewed from the high-frequency power source 8, the capacitive reactance $X_C$ ($X_L=1/(2\pi f_H C)$, where $f_L$ is the frequency of the high-frequency power source 8) is small at high frequency.

Meanwhile, at high frequency, the inductive reactance $X_L$ ($X_L=2\pi f_H L$, where $f_H$ is the frequency of the high-frequency power source 8) is large at high frequency. Consequently, the leakage of current from the high-frequency power source 8 to the low-frequency power source 6 is blocked by the large inductive reactance $X_L$ of the inductance 5 at high frequency ($f_H$). Namely the inductance 5 functions as the inductance for blocking high-frequency current.

In the welding equipment 1, 25, 30 for metallic materials, the capacitor 7 functions as a capacitor for blocking the flow of current from the low-frequency power source 6 to the high-frequency power source 8, and the inductance 5 functions as an inductance for blocking the flow of current from the high-frequency power source 8 to the low-frequency power source 6, namely functions as a choke coil.

C-type gun arms 2 of various shapes are used depending on the size of steel plates 9 to be subject to spot welding. Therefore, if the floating inductance 5 of the C-type gun arm 2 is not large, an inductance 13 for blocking high-frequency current may be added so that a predetermined inductive reactance $X_L$ is obtained at high frequency in the welding equipment 1, 25, 30 for metallic materials. This external inductance 13 can be connected to the secondary winding of the welding transformer 16 on the side of the low-frequency power source 6, for example.

The features of the welding equipment 1, 25, 30 for metallic materials according to the present invention include that the low-frequency power source 6 and the high-frequency power source 8 are separated from each other using the inductance 5 and the capacitor 7 and that power from the low-frequency power source 6 and the high-frequency power source 8, namely the power having two different frequencies, can be applied to the electrodes 4 simultaneously.

(Current Distribution on Steel Plates)

Figure 5A:
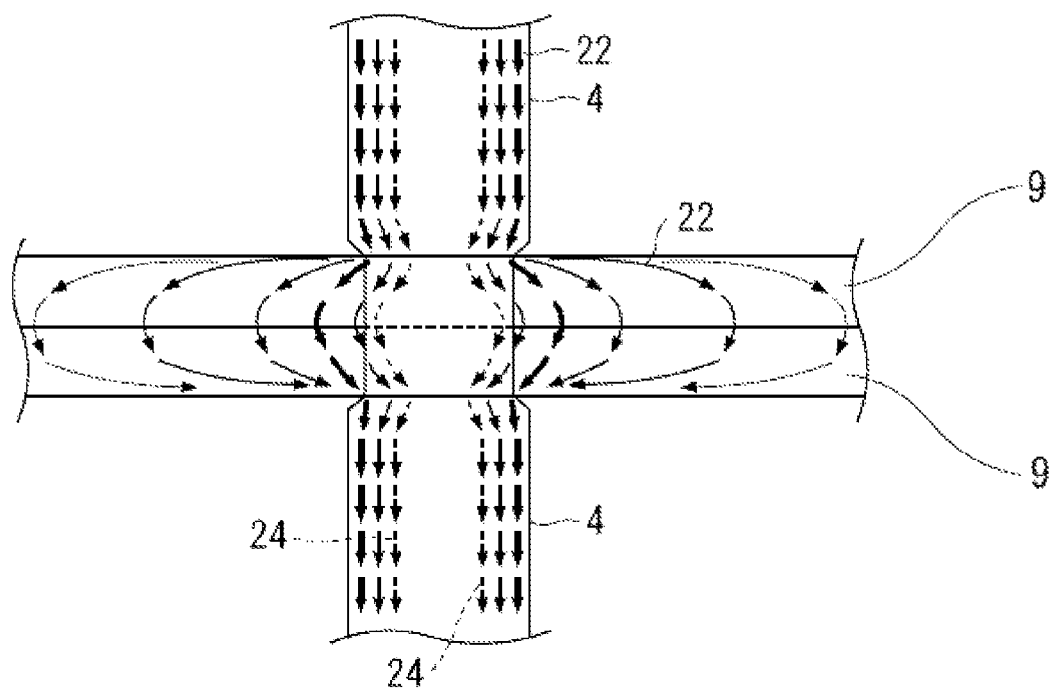
FIG. 5A is a cross-sectional view illustrating a current distribution formed on two steel plates contacting each other when electric power is applied to the steel plates simultaneously from a low-frequency power source and a high-frequency power source.

FIG. 5A is a cross-sectional view illustrating the current distribution seen on two steel plates 9 contacting each other when electric power is applied to the steel plates 9 simultaneously from a low-frequency power source 6 and a high-frequency power source 8. FIGS. 6A-6F illustrate the heated status of the steel plates 9.

The solid line in FIG. 5A represents the flow of high-frequency current 22 from the high-frequency power source 8, and the broken line represents the flow of low-frequency current 24 from the low-frequency power source 6. The electrodes 4, which is made of copper, has the diameter of 6 mm, and the frequency of the low-frequency power source 6 is 50 Hz. Each steel plate is 2 mm thick, and the frequency of the high-frequency power source 8 is 40 kHz. The low-frequency current flows within the entire area of the electrodes 4, 4, and the steel plates 9 are energized within the width approximately the same as the cross-sectional area of the nugget.

Figure 6A:
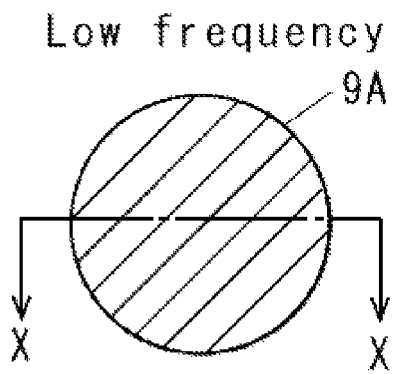
FIGS. 6A-6F illustrate the heating status of steel plates.
Figure 6B:
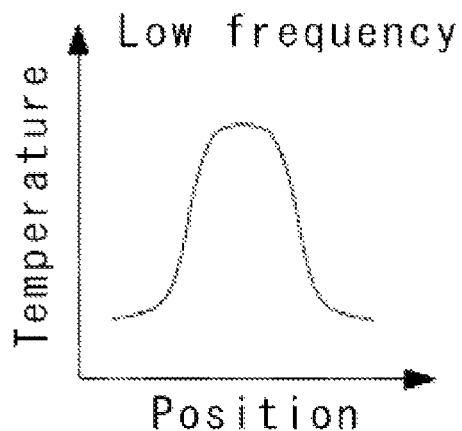

FIG. 6A is a plan view illustrating the region of the steel plates 9 heated by low-frequency current 24 only. The major heated region is the inside of the circle 9A defined by projecting the cross-sectional area of the axis of the electrodes 4 on the steel plates 9. FIG. 6B is a chart showing the temperature distribution seen along the line X-X in FIG. 6A. It is apparent that the inside of the circle 9A, namely the projection of the cross-sectional area of the axis of the electrodes 4, of the steel plates 9 are heated intensively.

Meanwhile, the high-frequency current 22 flows mainly on the surface of the electrodes 4 and along the outer peripheral region of the nugget. The difference in distribution between the low-frequency current 24 and the high-frequency current 22 derives from so-called skin depth.

Figure 6C:
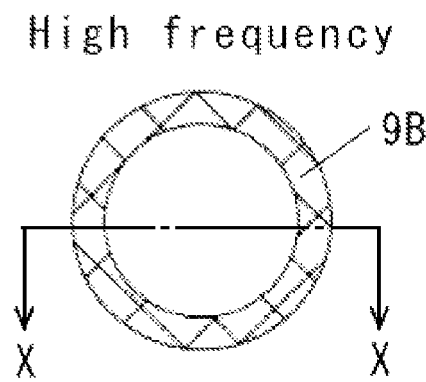
Figure 6D:
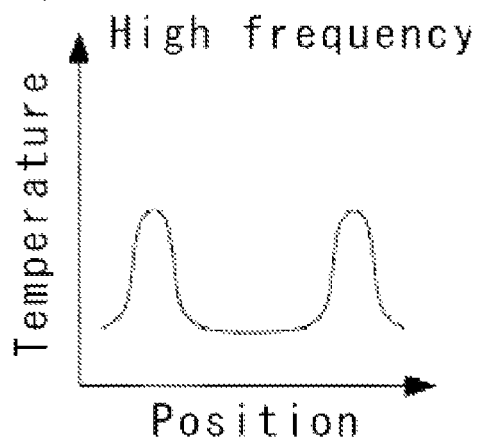

FIG. 6C is a plan view illustrating the region of the steel plates 9 heated by high-frequency current 22 only. The major heated region is the outer periphery of the circle defined by projecting the cross-sectional area of the axis of the electrodes 4, and the proximity of the outer periphery of the circle, namely the outermost ring-shaped area 9B close to the circle. FIG. 6D is a chart illustrating the temperature distribution seen along the line X-X in FIG. 6C. It is apparent that the outer periphery of the circle, defined by projecting the cross-sectional area of the axis of the electrodes 4 on the steel plates 9, and the ring-shaped proximity 9B of the outer periphery undergo resistance heating. In this case, the region heated by high-frequency current 22 includes the area of the steel plates 9 close to the high-frequency current 22 flowing on the surface of the electrodes 4 and therefore subject to induction heating. This induction heating is different from general induction heating performed using an induction heating coil. Consequently, the circle defined by projecting the cross-sectional area of the axis of the electrodes 4 on the steel plates 9, and the ring-shaped region 9B in proximity the outer periphery can be heated by resistance heating by the high-frequency current 22, or by the above high-frequency induction heating superposed on the resistance heating.

In FIG. 6D, by further changing the operating frequency of the high-frequency power source 8, the width of the ring-shaped region 9B can be changed. In actual spot welding performed by actually feeding low-frequency current 24, it was confirmed that with the change of the operating frequency of the high-frequency power source 8, the width of the high-temperature area in the outer peripheral region of the nugget also changed. Consequently, the circle defined by projecting the cross-sectional area of the axis of the electrodes 4 on the steel plates 9, and the ring-shaped region 9B in proximity to the periphery of the circle can be heated by resistance heating by the high-frequency current 22, or by the above high-frequency induction heating superposed on the resistance heating.

Figure 6E:
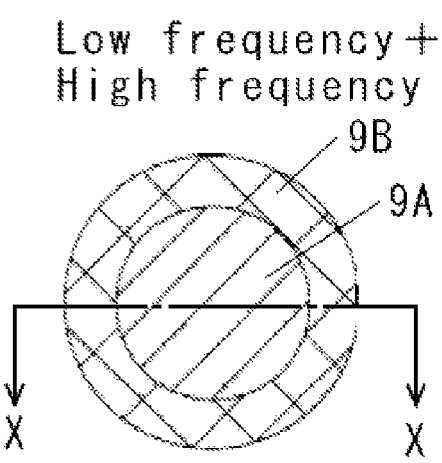
Figure 6F:
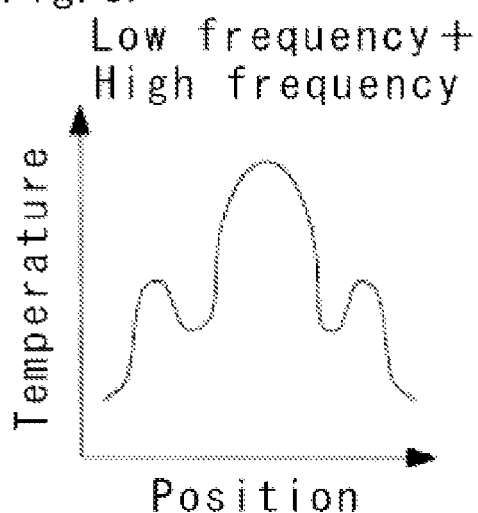

In view of this, if electric power is applied to two steel plates 9 contacting each other from the low-frequency power source 6 and the high-frequency power source 8 simultaneously, the heated region on the steel plates 9 is the superposed region of the inside of the circle 9A, namely the region where the low-frequency current 24 flows, and the ring-shaped region 9B, namely the region where the high-frequency current 22 flows, as shown in FIG. 6E. Furthermore, as shown in FIG. 6F, the temperature distribution on the steel plates 9 obtained by feeding these currents 22, 24 is the superposition of the temperature distribution by the low-frequency current 24 (FIG. 6B) and that by the high-frequency current 22 (FIG. 6D). Namely, the inside of the circle 9A defined by projecting the cross-sectional area of the axis of the electrodes 4 on the steel plates 9, the periphery of the circle defined by projecting the cross-sectional area of the axis of the electrodes 4 on the steel plates 9, and the ring-shaped region 9B in proximity to the periphery of the circle of the steel plates 9 are heated.

(Skin Depth)

The skin depth ($\delta$) is expressed by formula (1) shown below:

$$\delta = 503.3 \times (\rho/(\mu \times f))^{1/2} \text{ (m)} \quad (1)$$

where, $\rho$ represents the resistivity of the material, $\mu$ represents the relative permeability of the material, and f represents frequency (Hz).

Since the skin depth changes in proportion to the one-half power of the frequency, the lower the frequency, the thicker the skin depth, and the higher the frequency, the thinner the skin depth, on condition that the material is the same. Since the frequency of the power source used for spot welding is generally 50 Hz or 60 Hz, current is fed in the entire electrodes if the diameter of the electrodes is approximately 6 mm.

Meanwhile, to heat the surface of the steel plates 9 only, the frequency of the high-frequency power source 8 can be set using the above formula (1) so that a predetermined skin depth can be obtained. Consequently, the heating width of the outer peripheral region of the nugget can be selected by setting frequency. Namely, by changing the frequency of the high-frequency current 22, the heating width of the outer peripheral region of the nugget can be changed, and the ring-shaped region 9B can undergo heat treatment such as tempering. Therefore, if relatively soft materials, such as S20C annealed material for example, are used as steel plates 9, the ring-shaped region 9B can be softened.

The magnitude of the high-frequency current 22 at the skin depth of the material is expressed as 1/e (e: natural logarithm) of the value on the outermost surface, namely approximately ⅓. The skin depth of the steel plates 9 is approximately 9.3 mm when the frequency is 50 Hz, and 0.3 mm when the frequency is 40 kHz.

(Selection of the Frequency of High-Frequency Power Source)

The frequency of the high-frequency power source 8 is determined by the capacity of the inductance 5 connected to the secondary winding of the welding transformer 16, inductance 13 that is inserted as required, and matching capacitor 7. When the floating inductance of the gun arm 2 is used as inductance 5, the capacity of the inductance 5 is determined by the shape of the gun arm 2. As a result, the frequency is determined by the capacity of the matching capacitor 7. If the frequency increases, the heating width in the temperature increase pattern of the outer peripheral region becomes narrow and local due to skin effect. However, since the inductance 5 ($\omega L$) of the gun arm 2 is proportional to the frequency, the voltage of the matching capacitor 7 also increases. The circuit with the electrodes 4, 4 viewed from the high-frequency power source 8 is a series resonance circuit. At the series resonance frequency, since the voltage of the inductance 5 and that of the matching capacitor 7 are identical, with the increase of the voltage of the matching capacitor 7, combination of dual frequencies, namely low and high frequencies, becomes difficult and an inductance 5 for blocking large current or inductance 13 must be provided. Since the inductances 5, 13 for blocking large current affect the low-frequency current 24, the secondary voltage of the conventional spot welding equipment must be increased significantly.

On the contrary, if the series resonance frequency decreases, the heating width of the temperature increase pattern of the outer peripheral region of the nugget increases. However, since the voltage of the matching capacitor 7 decreases, combination of dual frequencies becomes easier. The gun arm 2 must be equipped with a welding transformer 16, bypass capacitor 11, and inductance 13 for blocking current as necessary. Of these, the weight of the welding transformer 16 is the heaviest, and it is inversely proportional to the frequency. In view of the above, the optimum operating frequency falls within 5 kHz to 40 kHz range, provided that a gun arm 2 is mounted to the welding equipment such as welding robot. It is desirable that the difference between the low frequency and the high frequency be 10 times higher than two-frequency synthesis circuit.

(Heat Treatment Using Welding Equipment for Metallic Materials)

Spot welding and heat treatment using the welding equipment 1, 25, 30 for metallic materials according to the present invention will hereafter be described.

Metallic materials 9 are welded as follows: a pair of electrodes sandwiches the metallic materials 9 and power is applied to the materials to heat them. For example, it is sufficient that the spot welding has a first step of heating a predetermined region of metallic materials 9 by first energization to the pair of electrodes 4, 4, and a second step of heating a region different from that of the first step by second energization to the pair of electrodes 4, 4, with the pair of electrodes 4, 4 that sandwich the metallic materials 9 maintained at the same position. In this case, the heating time in the first step and that in the second step can be controlled independently from each other. If the first energization is performed with the low-frequency power source 6, the region of the metallic materials 9 heated by the first energization is the region within the circle 9A described above. If the second energization is performed with the high-frequency power source 8, the region of the metallic materials 9 heated by the first energization is the ring-shaped region 9B described above. The first and the second steps described above may be combined.

Figure 7:
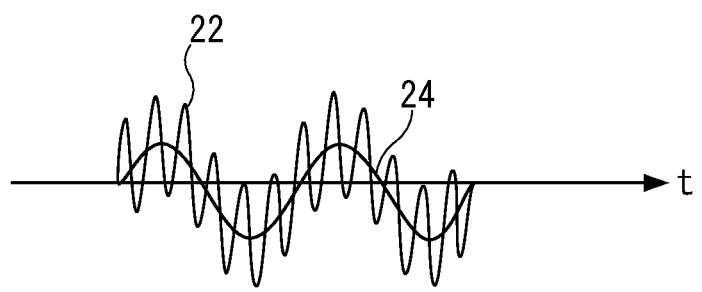
FIG. 7 shows heating waveforms obtained when spot welding and heating treatment are performed simultaneously using the power from a low-frequency power source and that from a high-frequency power source.
Figure 8:
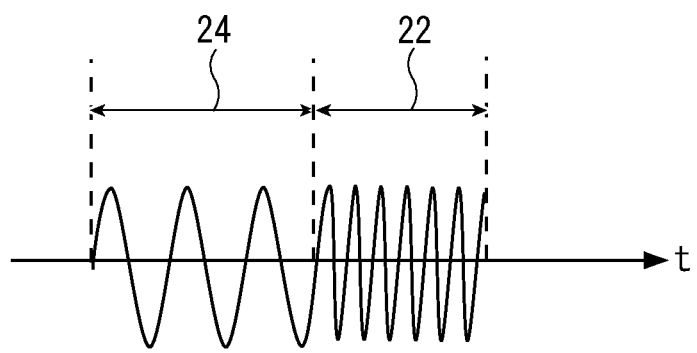
FIG. 8 shows a heating waveform obtained when the power from a high-frequency power source is applied after the power from a low-frequency power source is applied.
Figure 9:
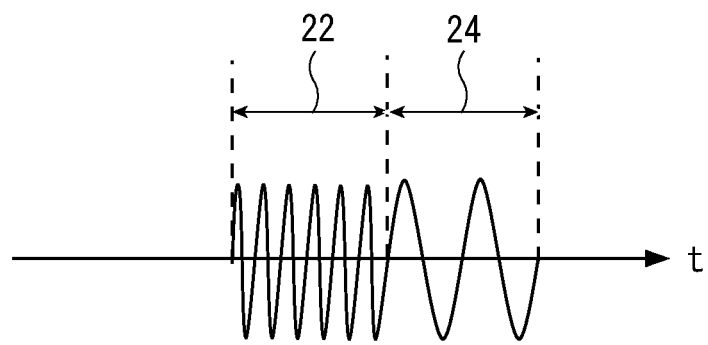
FIG. 9 shows a heating waveform obtained when preheating is performed using a high-frequency power source before the power from a low-frequency power source is applied.

FIGS. 7 to 9 are charts illustrating the waveform of the current flowing in the pair of electrodes 4, 4. In FIGS. 7 to 9, the horizontal axis represents time (arbitrary scale), and the vertical axis represents waveform (arbitrary scale) of the current 22, 24 fed from the high-frequency power source 8 and the low-frequency power source 6.

FIG. 7 shows heating waveforms obtained when spot welding and heating treatment are performed simultaneously using the power from the low-frequency power source 6 and that from the high-frequency power source 8. As shown in FIG. 7, the entire nugget formed by welding is heated by the power from the low-frequency power source 6, and at the same time, the outer peripheral region of the nugget is also heated by the power from the high-frequency power source 8. The entire area of the nugget corresponds to the internal area 9A of the circle defined by projecting the cross-sectional area of the axis of the electrodes 4 on the steel plates 9. The outer peripheral region of the nugget corresponds to the circle defined by projecting the cross-sectional area of the axis of the electrodes 4 on the steel plates 9, and the ring-shaped region 9B in proximity to the periphery of the circle.

The current distribution obtained when power is simultaneously applied from the low-frequency power source 6 and the high-frequency power source 8 indicates that according to the welding equipment 1, 25, 30 for metallic materials of the present invention, spot welding of steel plates 9 can be performed using the low-frequency power source 6, and that the surface of the two steel plates 9 surrounding but not contacting the electrodes 4 can be heated by the high-frequency power source 8.

FIG. 8 shows a heating waveform obtained when the power from the low-frequency power source 6 is applied and then the power from the high-frequency power source 8 is applied. As shown in FIG. 8, when the power is applied from the low-frequency power source 6 first and then from the high-frequency power source 8 after the first power application is stopped, the steel plates 9 are spot-welded by the application of power from the low-frequency power source 6. By the power from the high-frequency power source 8, the region on the surface of the two steel plates 9, which is the outer peripheral region of the nugget and does not contact the electrodes 4, is heated.

According to the welding equipment 1, 25, 30 of the present invention, by applying the power from the low-frequency power source 6 and then from the high-frequency power source 8, heating treatment (also called annealing) of the outer peripheral region of the nugget formed by spot welding can thus be performed. By adjusting the temperature and heating time, this treatment can be adopted to tempering, etc. of the steel plates 9 and those made of other materials.

FIG. 9 shows a heating waveform obtained when preheating is performed using a high-frequency power source 8 before the power from a low-frequency power source 6 is applied. As shown in FIG. 9, if the power from the high-frequency power source 8 is applied and then the power from the low-frequency power source 6 is applied, the surface of the region of the steel plates 9 not spot-welded, namely the region in proximity to but not contacting the copper electrodes 4, is heated first. By applying the power from the low-frequency power source 6 after this preheating is performed, the two steel plates 9 are spot-welded.

According to the welding equipment 1, 25, 30 for metallic materials of the present invention, by applying power from the high-frequency power source 8 and then from the low-frequency power source 6, the proximity of the region to be spot-welded can also be preheated before being welded. By adjusting the temperature and heating time of the preheating, hardening that may occur during spot welding can be prevented.

The current distribution on two steel plates 9 contacting each other was described above. The current distribution on three or more steel plates 9 laid on top of one another will hereafter be described.

Figure 5B:
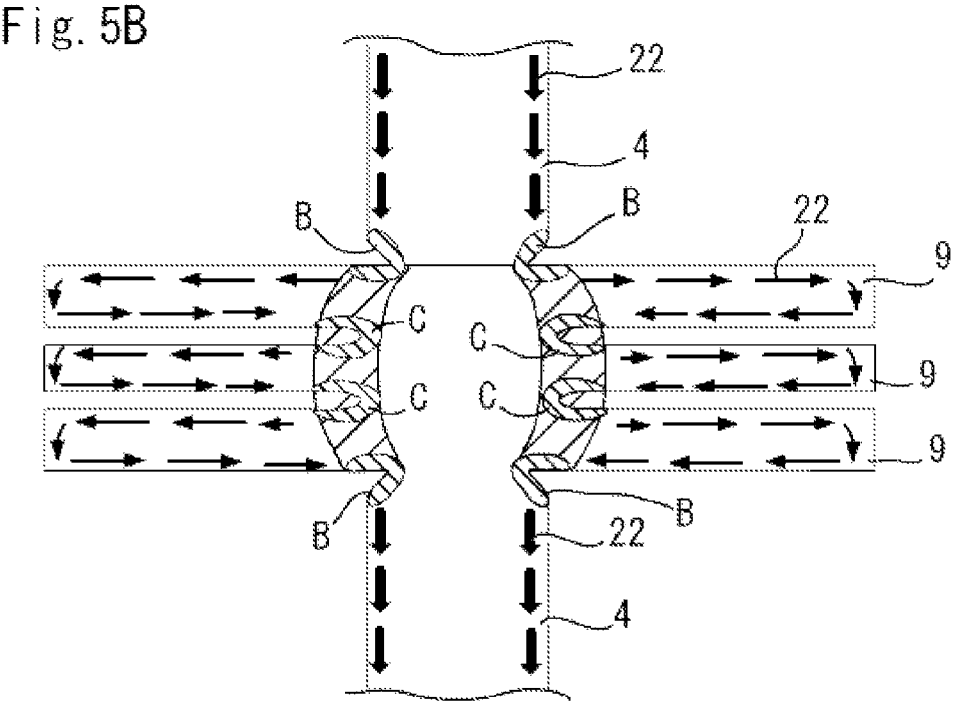
FIG. 5B is a cross-sectional view illustrating the heating status of three steel plates laid on top of one another by high-frequency current.

FIG. 5B is a cross-sectional view illustrating the heating status of three steel plates 9 laid on top of one another by high-frequency current. As shown in FIG. 5B, when three steel plates 9 are laid on top of one another, ring-shaped regions B at two positions, edge portions C of the contacting faces of the steel plates 9 at two positions, namely ring-shaped regions at four positions in all, are heated by the high-frequency current 22.

(Skin Depth)

When power having low or high frequency is applied to steel plates 9, the skin depth changes in proportion to the minus one-half power of the frequency, Therefore, the lower the frequency, the thicker the skin depth, and the higher the frequency, the thinner the skin depth, on condition that the material is the same. Since the frequency of the power source used for spot welding is generally 50 Hz or 60 Hz, current is fed in the entire electrodes if the diameter of the electrodes is approximately 6 mm.

Meanwhile, to heat the surface of the steel plates 9 only, the frequency of the high-frequency power source 28 can be set so that a given skin depth can be obtained. Consequently, the heating width of the outer peripheral region of the nugget can be selected by setting frequency. Namely, by changing the frequency of the high-frequency current 22, the heating width of the outer peripheral region of the nugget can be changed, allowing the ring-shaped regions B to be subject to heat treatment such as tempering to soften the ring-shaped regions 2B.

The magnitude of the high-frequency current 22 at the depth of the skin depth of the material is expressed as $1/e$ (e: natural logarithm) of the value of the outermost surface, namely approximately ⅓. The skin depth of the steel plates 9 is approximately 9.3 mm when the frequency is 50 Hz, and 0.3 mm when the frequency is 40 kHz.

(Modification of Heat Treatment Using the Welding Equipment for Metallic Materials)

Yet another heating method by the welding equipment 1 for metallic materials will hereafter be described.

Figure 10:
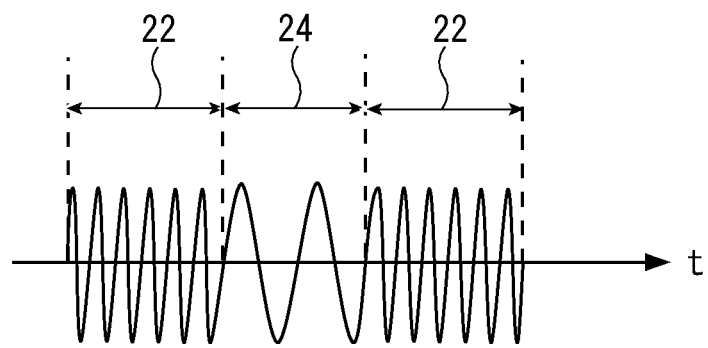
FIG. 10 shows a heating waveform obtained when preheating using a high-frequency power source, heating using a low-frequency power source, and post-heating using the high-frequency power source are performed consecutively.
Figure 11:
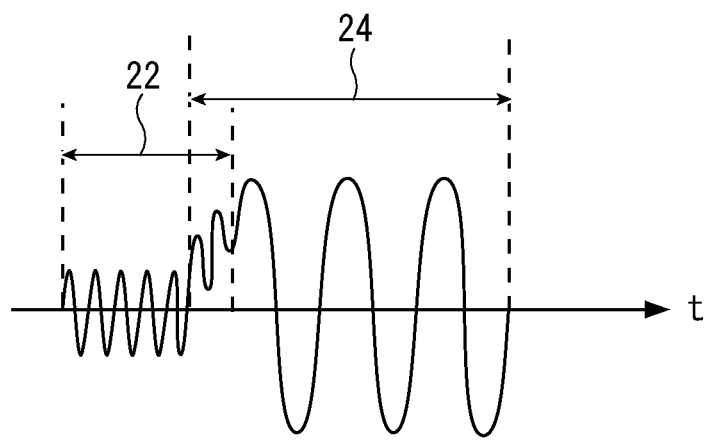
FIG. 11 shows a heating waveform obtained when preheating using a high-frequency power source and partial heating using the high-frequency power source and a low frequency power source are performed simultaneously.
Figure 12:
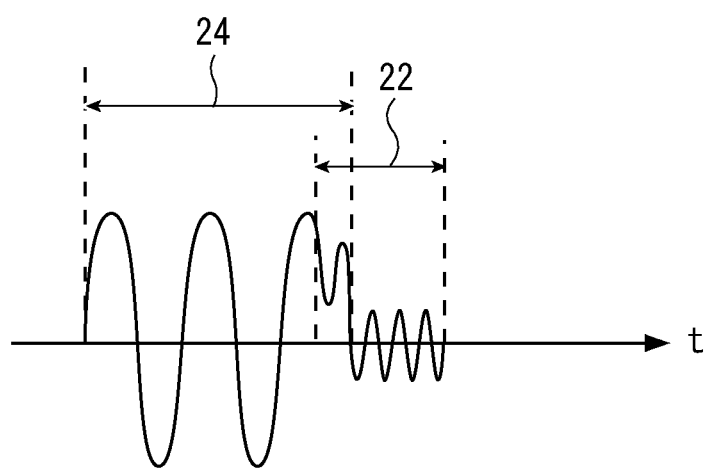
FIG. 12 shows a heating waveform obtained when heating using a low-frequency power source and post-heating using a high-frequency power source are performed, and furthermore simultaneous partial heating is performed using the low-frequency power source and the high-frequency power source.

FIGS. 10 to 12 show typical waveforms of the current fed to a pair of electrodes. The horizontal axis represents time (arbitrary scale), whereas the vertical axis represents the waveforms 22, 24 (arbitrary scale) of the voltage applied from the low-frequency power source 6 and the high-frequency power source 8 to the pair of electrodes.

FIG. 10 shows a heating waveform obtained when preheating using a high-frequency power source 8, heating using a low-frequency power source 6, and post-heating using the high-frequency power source 8 are performed consecutively. The term post-heating is defined as the heating to be performed after preheating. Namely, post-heating is the heat treatment to be performed after the spot welding of the steel plates 9 is performed using the low-frequency power source 6.

If power is applied from the high-frequency power source 8 and then from the low-frequency power source 6, the surface area of the steel plates 9 not spot-welded is heated first. By applying the power from the low-frequency power source 6 after this preheating, the two steel plates 9 are spot-welded. Furthermore, heat treatment of the outer peripheral region of the nugget, which is formed by spot-welding, can be performed by post-heating using the power from the high-frequency power source 8. By adjusting the temperature and heating time, the treatment is adaptable to the heat treatment of steel plates 9 such as tempering.

FIG. 11 shows a heating waveform obtained when preheating using a high-frequency power source 8 and partial heating using the high-frequency power source 8 and a low frequency power source 6 are performed simultaneously. As shown in FIG. 11, the power from the high-frequency power source 8 is applied for the period of preheating, and for the predetermined initial period starting from the time when the application of power from the low-frequency power source 6 is started. Namely, for the initial period of application of power from the low-frequency power source 6 only, the power from the high-frequency power source 8 is superposed. The effect of preheating similar to that of the heating method shown in FIGS. 6A-6F can be expected. Furthermore, since the power from the low-frequency power source 6 and the high-frequency power source 8 are applied to the steel plates 9 partially superposed, spot-welding can be performed using the simultaneous heating method as shown in FIG. 7, and at the same time, the outer peripheral surface of the two steel plates 9 not contacting the electrodes 4 can also be heated using the power from the high-frequency power source 8.

FIG. 12 shows a heating waveform obtained when heating using a low-frequency power source 6 and post-heating using a high-frequency power source 8 are performed, and then simultaneous partial heating is performed using the low-frequency power source 6 and the high-frequency power source 8. As shown in FIG. 12, the power from the high-frequency power source 8 is applied for a given period before the completion of application of power from the low-frequency power source 6 and for the period of post-heating performed immediately after that period. Since the power from the low-frequency power source 6 and the high-frequency power source 8 are superposed partially, spot-welding having the heating waveform as shown in FIG. 7 can be performed, and at the same time, the region on the surface of the two steel plates 9 that falls within the outer peripheral region of the electrodes 4 and does not contact the electrodes 4 can also be heated using the power from the high-frequency power source 8. The effect of the post-heating similar to the heating method shown in FIG. 8 can be expected.

Since the heating time of the steel plates 9 by the high-frequency power source 8 described above can be controlled by the energization control unit 10, the temperature of the region of the steel plates 9 to be spot-welded only can be increased, and consequently the power consumption for the heating can be reduced.

(Modification 3 of the Welding Equipment for Metallic Materials)

Modification 3 of the welding equipment for metallic materials will be described below.

Figure 13:
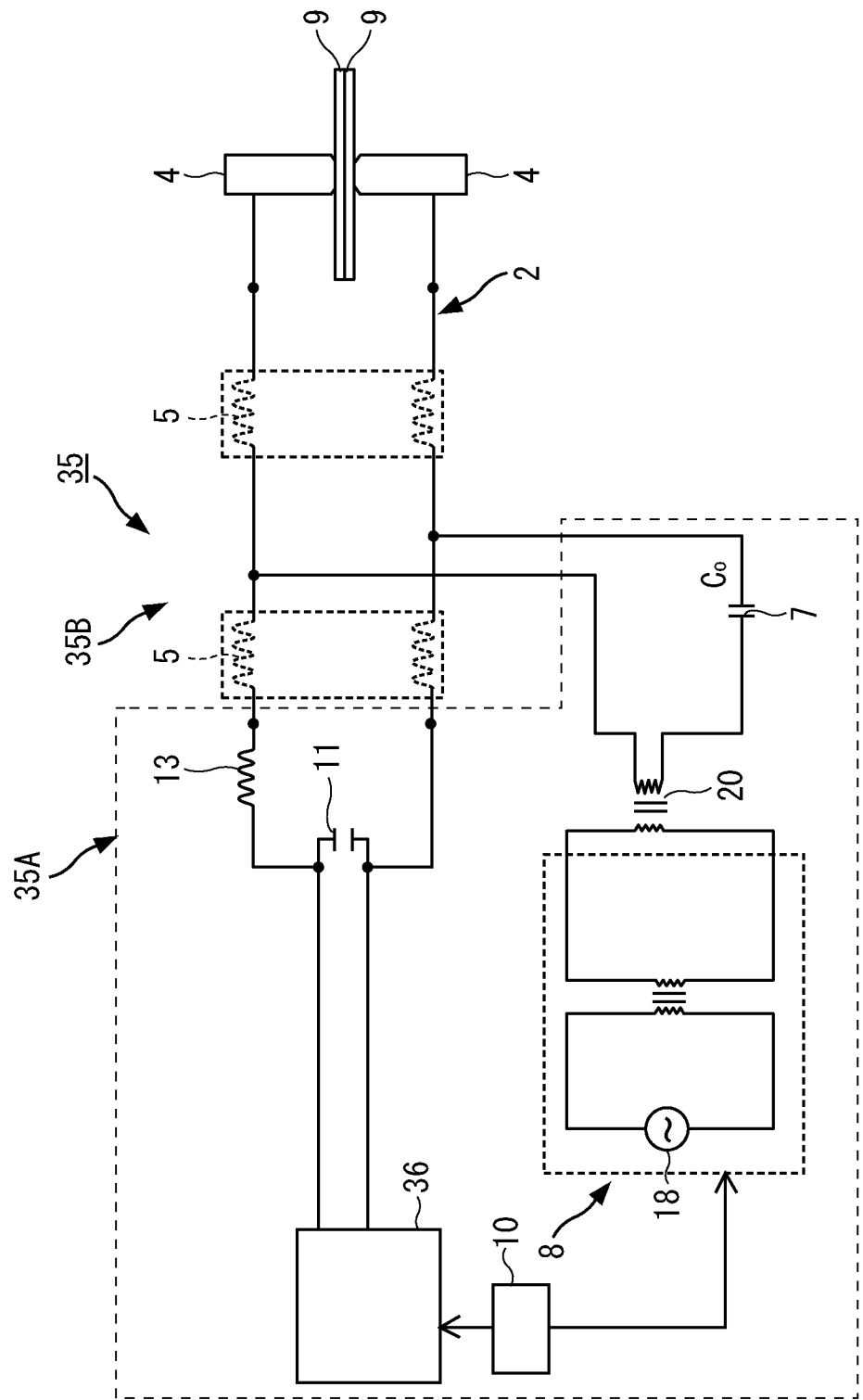
FIG. 13 is an electric circuit diagram of modification 3 of the welding equipment for metallic materials.

FIG. 13 is the electric circuit diagram of modification 3 of the welding equipment for metallic materials. The welding equipment 35 for metallic materials shown in FIG. 13 is the same as the welding equipment 1 shown in FIG. 2 except that a DC power source 36 is used as a spot-welding power source 6 instead of low-frequency power source. The DC power source 36 uses an inverter, etc., and the magnitude of DC current and the energization time are controlled by the energization control unit 10. Since other configurations are the same as those of the welding equipment 1 for metallic materials, description is omitted.

(Modification 4 of the Welding Equipment for Metallic Materials)

Modification 4 of the welding equipment for metallic materials will be described below.

Figure 14:
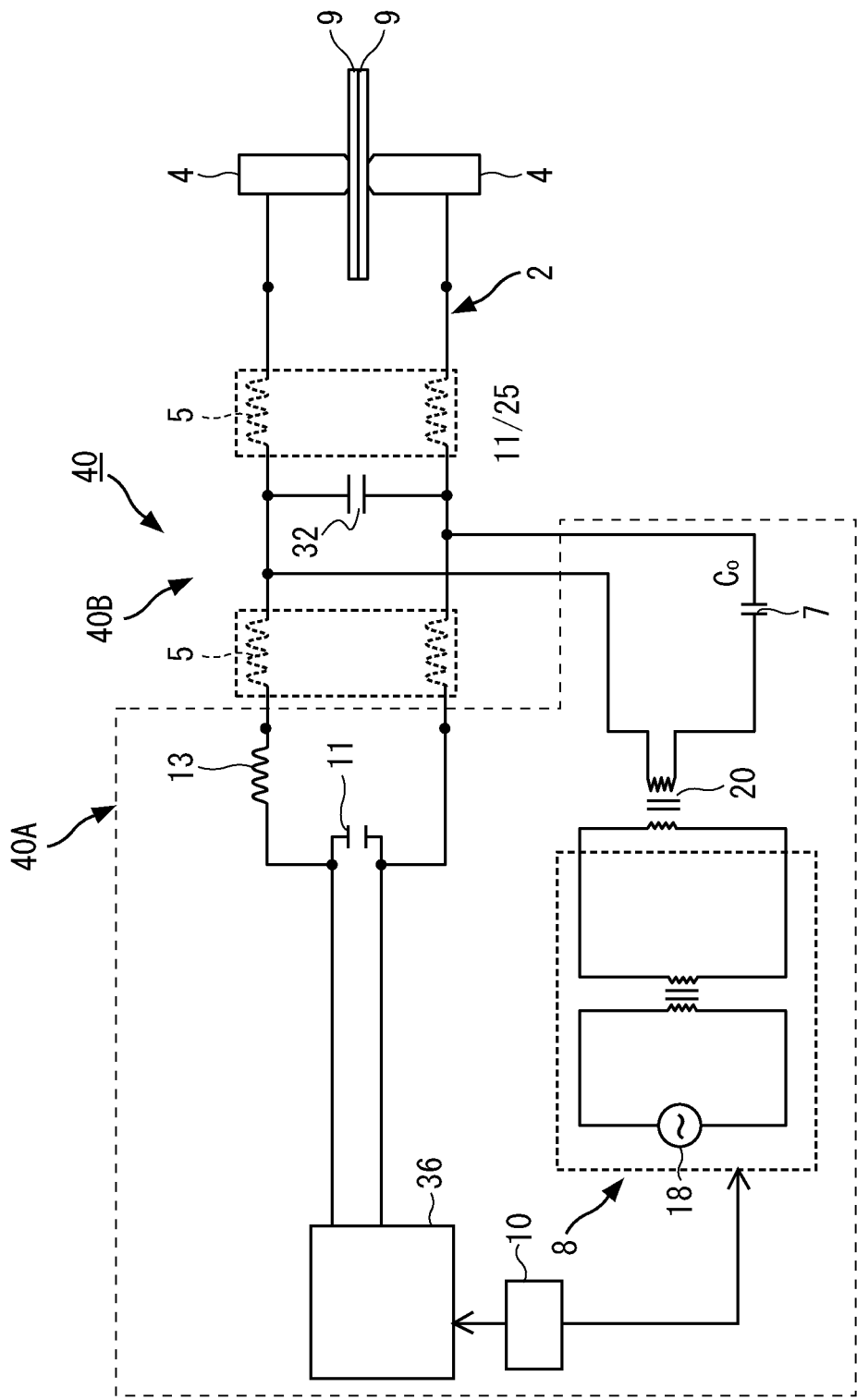
FIG. 14 is an electric circuit diagram of modification 4 of the welding equipment for metallic materials.

FIG. 14 is the electric circuit diagram of modification 4 of the welding equipment for metallic materials. The welding equipment 40 for metallic materials shown in FIG. 14 is the same as the welding equipment 30 for metallic materials shown in FIG. 4 except that a DC power source 36 is used instead of the low-frequency power source 6. The DC power source 36 uses an inverter, etc. and the magnitude of direct current and energization time are controlled by the energization control unit 10. Since other configurations are the same as those of the welding equipment 30 for metallic materials, description is omitted.

With the welding equipment 35, 40 for metallic materials also, the capacitor 7 functions as a capacitor for blocking current from the DC power source 36 to the high-frequency power source 8, and the inductance 5 functions as an inductance for blocking the flow of current from the high-frequency power source 8 to the low-frequency power source 6, namely functions as a choke coil.

According to the welding equipment 35, 40 for metallic materials, since spot-welding is performed by feeding direct current to the electrodes 4, 4, no skin effect is expected unlike the case where the low-frequency power source 6 is used, and that is why the size of the electrodes 4, 4 can be selected depending on the work 9.

(Heating Method to be Adopted when DC Power Source is Used as Welding Power Source)

With the welding equipment 35, 40 for metallic materials using a DC power source 36 as a welding power source 6 also, the heating methods applied to the welding equipment 1, 25, 30 for metallic materials can be adopted.

FIGS. 15 to 19 provide heating waveforms of the welding equipment 35, 40 for metallic materials. The horizontal axis of each figure represents time (arbitrary scale), whereas the vertical axis represents the magnitude of the waveforms 26, 22 of the current fed from the DC power source 36 and the high-frequency power source 8 (arbitrary scale).

Figure 15:
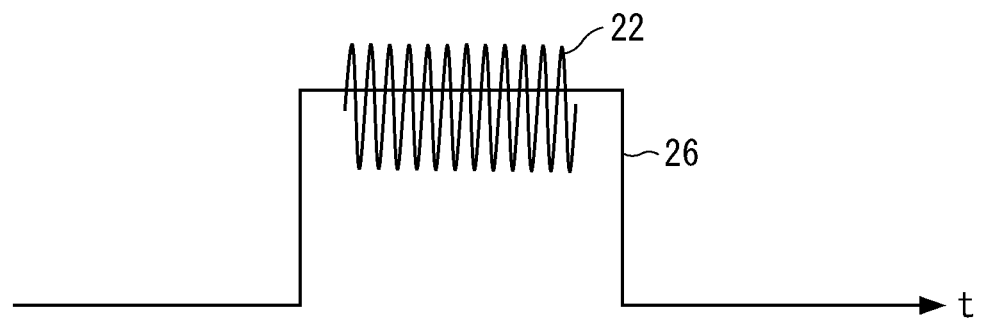
FIG. 15 shows heating waveforms obtained when simultaneous heating is performed using a DC power source and a high-frequency power source.

FIG. 15 shows heating waveforms obtained when simultaneous heating is performed using the DC power source 36 and the high-frequency power source 8. The effect of the simultaneous heating is the same as that of the simultaneous heating performed using the low-frequency power source 6 and the high-frequency power source 8 shown in FIG. 7.

Figure 16:
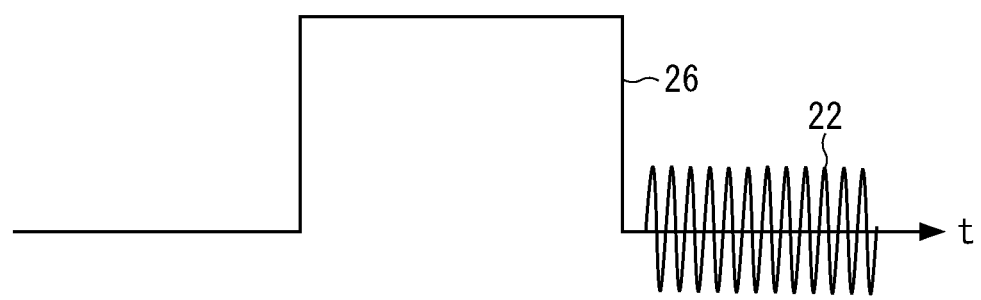
FIG. 16 shows heating waveforms obtained when a high-frequency power source is used for post-heating.

FIG. 16 shows heating waveforms obtained when the high-frequency power source 8 is used for post-heating. The effect of the post-heating using the high-frequency power source 8 is the same as that of post-heating performed using the high-frequency power source 8 shown in FIG. 8.

Figure 17:
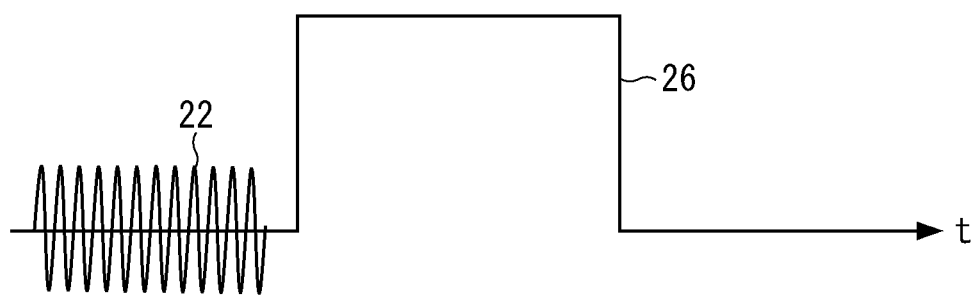
FIG. 17 shows heating waveforms obtained when a high-frequency power source is used for preheating.

FIG. 17 shows heating waveforms obtained when the high-frequency power source 8 is used for preheating. The effect of the preheating using the high-frequency power source 8 is the same as that of the preheating performed using the high-frequency power source 8 shown in FIG. 9.

Figure 18:
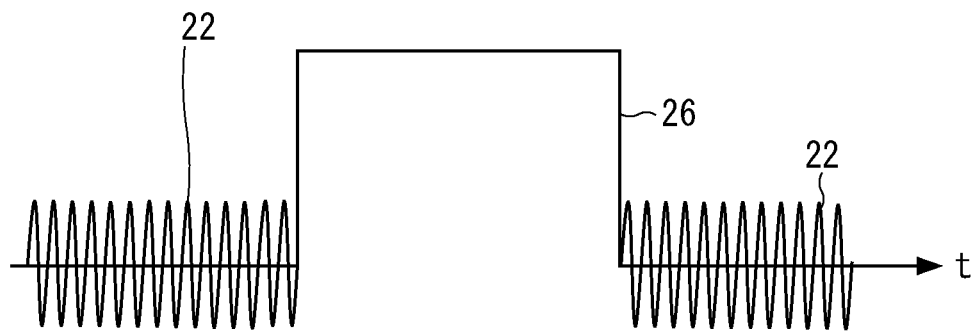
FIG. 18 shows heating waveforms obtained when preheating using a high-frequency power source, heating using a DC power source, and post-heating using the high-frequency power source are performed consecutively.

FIG. 18 shows heating waveforms obtained when pre-heating using the high-frequency power source 8, heating using the DC power source 36, and post-heating using the high-frequency power source 8 are performed sequentially. The effect of the heating in this case is the same as that of the heating method shown in FIG. 10.

Figure 19:
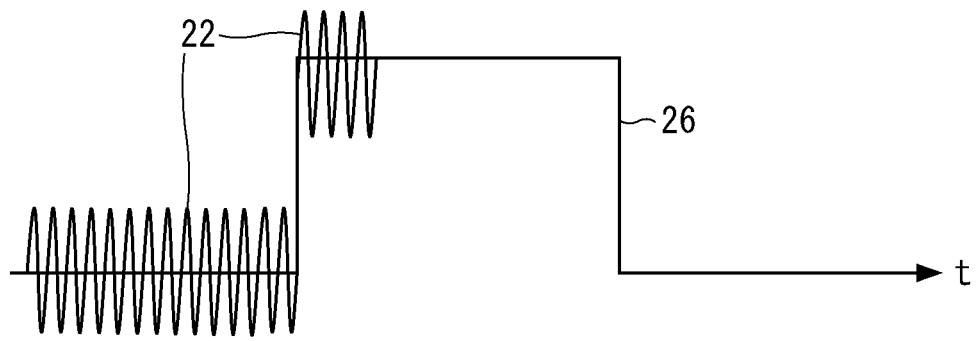
FIG. 19 shows heating waveforms obtained when preheating is performed using a high-frequency power source, and partial and simultaneous heating are also performed using the high-frequency power source and a DC power source.

FIG. 19 shows heating waveforms obtained when pre-heating is performed using the high-frequency power source 8, and partial and simultaneous heating are also performed using the high-frequency power source 8 and the DC power source 36. In this case, the high-frequency power source 8 applies power for preheating, and keeps applying power for a given period immediately after the start of application of power from the DC power source 36. Namely, the power from the high-frequency power source 8 is superposed for the initial period of application of power from the low-frequency power source 6. The effect of the preheating is the same as that of the heating method shown in FIG. 11.

Figure 20:
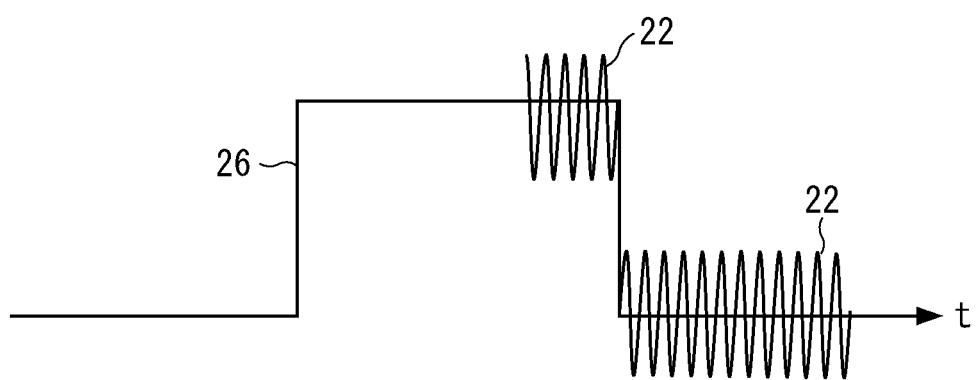
FIG. 20 shows heating waveforms obtained when partial and simultaneous heating is performed using a high-frequency power source and a DC power source, and then post-heating is performed using the high-frequency power source.

FIG. 20 shows heating waveforms obtained when partial and simultaneous heating is performed using the high-frequency power source 8 and the DC power source 36, and then post-heating is performed using the high-frequency power source 8. In this case, the power from the high-frequency power source 8 is applied for a given period immediately after the completion of application of power from the DC power source 36. Namely, the power from the high-frequency power source 8 is superposed immediately before the completion of the application of the power from the low-frequency power source 6. The effect of the pre-heating is the same as that of the heating method shown in FIG. 12.

Since the heating time of the steel plates 9 by the high-frequency power source 8 described above can be controlled by the energization control unit 10, the temperature of the region of the steel plates 9 to be spot-welded only can be increased, and consequently the power consumption for the heating can be reduced.

According to the present invention, by connecting the high-frequency power source 8 to the work 9 via the electrodes 4 of the welding equipment 1, 25, 30, 35, 40 for metallic materials, partial heating of non-contacting region can be performed. The timing for performing high-frequency heating of the work 9 can be selected from before, after, and at the same time as the application of the power from the low-frequency power source 6 or the DC power source 36.

With the welding equipment 1, 25, 30, 35, 40 for metallic materials, the steel plates 9 can be hardened as a result of quenching performed after welding. In this case, as the direction of quenching, heat dissipation in the horizontal direction of the steel plates 9 (FIG. 7) and the heat transfer from the electrodes 4, 4 in the vertical direction are assumed. The effect of heat transfer from the electrodes 4, 4 in the vertical direction is significant because the electrodes 4, 4 are water cooled. As a specific example of heat reservoir, high-frequency energization is performed after spot-welding to create a region where heat is reserved along the outer peripheral region of the nugget, and the nugget is then cooled based on the heat transfer in the vertical direction of the electrodes 4, 4. Consequently, since heat transfer occurs in the vertical direction only, unlike the case in which high-frequency energization is not performed and therefore heat transfer occurs both in the vertical and horizontal directions, formation of tissues due to solidification can be controlled.

With the temperature increase profile of steel plates 9 of conventional spot welders, the temperature of the central area, where the electrodes 4, 4 and the steel plates contact each other, becomes the highest, and a nugget is formed in this high-temperature region. Namely, with the conventional spot welders, the region immediately under the electrodes 4, 4 is heated. However, when the high-frequency current 22 is fed to the electrodes 4, 4, the high-frequency current 22 concentrates on the surface of the electrodes 4, 4 due to skin effect, and if the electrodes 4, 4 contact with the steel plates 9, the high-frequency current 22 flows on the surface of the steel plates 9 due to skin effect. In this current circuit, the region where the temperature of the steel plates 9 becomes highest is the outer periphery of the electrodes 4, 4, namely the outer peripheral region of the nugget.

In this way, by feeding high-frequency current 22 supplied from the high-frequency power source 8 to the electrodes 4, 4, partial heating of the outer peripheral region of the nugget only is ensured, and the temperature of this region becomes the highest. In addition, by narrowing this partial heating region, the heating method becomes more efficient compared to the heating of the entire region just below the electrodes 4, 4. Since high-frequency energization ensures the heating of outer peripheral region of the electrodes 4, 4, state of thermal well can be created. Consequently, melting and solidification are ensured in a state in which heat removal within the steel plates 9 is suppressed, and thus welding can be performed in a short time.

By selectively heating the outer peripheral region of the nugget, which determines the strength of the welded region, using high-frequency energization, a spot-welded junction having sufficient strength can be formed in a short time even if the carbon content of the steel plates is high.

With the welding equipment 1, 25, 30, 35, 40 for metallic materials, by performing two-frequency energization, the power from the spot-welding power source 6 can be used to form a melt-textured portion in the steel plates 9, whereas the power from the high-frequency power source 8 can be used to intensively perform heat treatment of the outer peripheral region of the nugget, which determines the strength. Consequently, since the area of the steel plates 9 to be welded can be heated intensively and independently, a desired spot-welding quality can be obtained in a period much shorter than that of the conventional spot welding.

With the conventional spot welding adopting the thyristor phase control method, the current is interrupted, which is undesirable from the viewpoint of welding quality. Meanwhile, the welding equipment 1, 25, 30, 35, 40 for metallic materials improve the quality of the spot welding of the steel plates 9 because the magnitude of the high-frequency current 22 is controlled, and the high-frequency current 22 is not interrupted.

(Work that can be Used for the Present Invention)

The above description assumes that the metallic materials 9 to be spot-welded are steel plates 9, but any other metallic materials can be used. In addition, any shapes of the work 9 can be selected. The above description assumes that two steel plates 9 are spot-welded, but three or more plates can be welded.

Furthermore, the metallic materials 9 to be spot-welded can be selected from those different from each other.

(Electrodes that can be Used for the Present Invention)

The above description assumes that the shape of the region defined by projecting the cross-sectional area of the electrodes 4 on the steel plates 9 is circular. However, any shapes other than the circular shape, such as ellipse, or polygonal shapes including square and triangle, can be selected.

Embodiment 1

The specific example of spot-welding the steel plates 9 with the welding equipment 1 for metallic materials of the present invention will hereafter be detailed.

Figure 21:
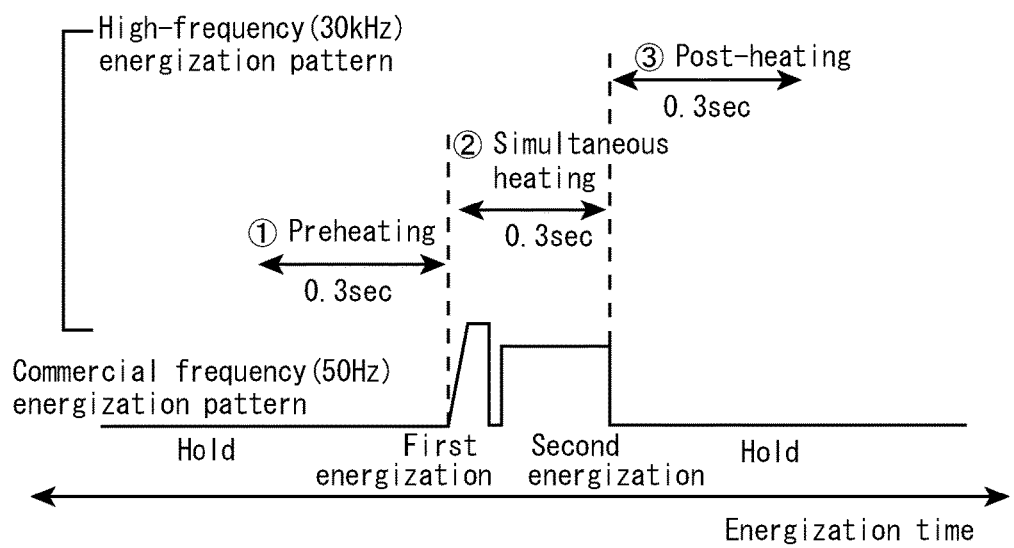
FIG. 21 is a chart illustrating the application of electric power from a low-frequency and high-frequency power supplies.

Spot-welding of two steel plates 9 were performed. FIG. 21 illustrates the application of electric power from a low-frequency power source 6 and a high-frequency power source 8. The conditions of the steel plates 9, low-frequency power source 6, and high-frequency power source were as follows:

Steel plates 9: Thickness; 2 mm, Size; 5 cm×15 cm

Low-frequency power source 6: 50 Hz (Material of electrodes 4: copper, diameter: 6 mm), capacity: 50 kVA Energization time of low-frequency power source 6: 0.3 to 0.5 sec.

High-frequency power source 8: 30 kHz, 50 kW output

Energization time of high-frequency power source 8: 0.3 to 0.6 sec.

The steel plates 9 contain carbon (C) in 0.19 to 0.29 weight %, as a component other than iron.

As shown in FIG. 21, preheating was performed for 0.3 sec. using the electric power from the high-frequency power source 8. The high-frequency power applied was changed from 4.9 kW to 37.0 kW.

Welding was then performed by applying power from the low-frequency power source 6. As shown in FIG. 18, power from the low-frequency power source 6 was applied twice, namely as the first energization and as the second energization. With the startup of the first current regarded as one cycle, the first energization was performed for two cycles with the first current value set at 11 kA. After cooling was performed for one cycle, the second energization was performed for 16 cycles with the second current value set at 8 kA. The two-stage energization by the low-frequency power source 6 was performed for 20 cycles including cooling, etc., and the welding time was 0.4 sec.

Embodiment 2

In embodiment 2, the power from the high-frequency power source 8 was applied together with the power from the low-frequency power source 6 for 0.3 sec. The high-frequency power was changed from 2.7 kW to 39.9 kW. The power from the low-frequency power source 6 was applied in the same manner as embodiment 1.

Embodiment 3

In embodiment 3, the power from the high-frequency power source 8 was applied for 0.3 sec. immediately after the completion of application of the power from the low-frequency power source 6. The high-frequency power was changed from 2.7 kW to 39.9 kW. The power from the low-frequency power source 6 was applied in the same manner as Embodiment 1.

Comparative Example

As a comparative example of Embodiments 1 to 3, welding was performed by applying power from the low-frequency power source 6, without applying power from the high-frequency power source 8. Namely, conventional spot-welding was performed.

A cross-tension strength test of the welded samples of the embodiments and comparative example was conducted to find the breaking force. Table 1 summarizes the high-frequency energization patterns, applied high-frequency power, and the average breaking force of the welded samples of the embodiments and the comparative example.

TABLE 1

|  | High-frequency energization | High-frequency energization pattern | High-frequency power (kW) | Number of samples | Breaking force | Average breaking force |
|---|---|---|---|---|---|---|
| Embodiment 1 | Performed | Preheating | 4.9 | 3 | 19.54 | 19.5 |
|  |  |  |  | 1 | 18.46 |  |
|  |  |  |  | 1 | 20.28 |  |

TABLE 1-continued

|  | High-frequency energization | High-frequency energization pattern | High-frequency power (kW) | Number of samples | Breaking force | Average breaking force |
|---|---|---|---|---|---|---|
|  |  |  | 8.6 | 1 | 21.26 |  |
|  |  |  | 20.9 | 1 | 19.59 |  |
|  |  |  | 28.5 | 1 | 17.98 |  |
|  |  |  | 37 | 1 | 19.58 |  |
| Embodi-Ment 2 |  | Simultaneous heating | 2.7 to 3.8 | 1 | 15.97 | 18.8 |
|  |  |  | 2.7 to 3.8 | 1 | 17.70 |  |
|  |  |  | 22.8 to 25 | 1 | 20.50 |  |
|  |  |  | 33.3 to 39.9 | 1 | 21.05 |  |
| Embodi-Ment 3 |  | Post-heating | 4.2 | 1 | 18.70 | 18.7 |
|  |  |  | 8.6 | 1 | 18.35 |  |
|  |  |  | 30.8 | 1 | 17.94 |  |
|  |  |  | 39.9 | 1 | 19.73 |  |
| Comparative example 1 | Not performed | — | — | 1 | 12.47 | 12.7 |
|  |  |  | — | 1 | 12.88 |  |

In embodiment 1, high-frequency power of 4.9 kW was applied to three welding samples for welding. The breaking force of each sample was 19.54 kN, 18.46 kN, and 20.28 kN respectively. When the high-frequency power was set to 8.6 kW, 20.9 kW, 28.5 kW, and 37.0 kW, the breaking force of respective samples was 21.26 kN, 19.59 kN, 17.98 kN, and 19.58 kN. From the above, it was found that the average breaking force of spot-welded samples in embodiment 1, in which spot-welding was performed using the low-frequency power source 6 after preheating was performed by high-frequency energization, was 19.5 kN.

In embodiment 2, high-frequency power of 2.7 to 3.8 kW was applied to two samples. The breaking force of each sample was 15.97 kN and 17.70 kN respectively. When the high-frequency power was set to 22.8 to 25.0 kW and 33.3 to 39.9 kW, the breaking force of respective samples was 20.5 kN and 21.05 kN. From the above, it was found that the average breaking force of spot-welded samples in embodiment 2, in which spot-welding was performed using the low-frequency power source 6 while applying high-frequency power, was 18.8 kN.

In embodiment 3, when the high-frequency power was set to 4.2 kW, 8.6 kW, 30.8 kW, and 39.9 kW, the breaking force of respective samples was 18.7 kN, 18.35 kN, 17.94 kN, and 19.73 kN. From the above, it was found that the average breaking force of the welded samples in embodiment 3, in which high-frequency power was applied after welding was performed using the low-frequency power source 6, was 18.7 kN.

Two samples were used for comparative example, and the breaking force of the samples was 12.47 kN and 12.88 kN respectively. From the above, it was found that the average breaking force of the samples having undergone conventional spot-welding based on two-step energization in the comparative example was 12.7 kN.

The average breaking force of the welding samples having undergone preheating in embodiment 1, simultaneous heating in embodiment 2, and post-heating in embodiment 3 was 1.54, 1.48, and 1.47 times as high as that of the comparative example respectively. More specifically, the average breaking force of the samples used for embodiments 1 to 3 was found to be approximately 50% higher than that of the samples having undergone spot-welding using the low-frequency power source 6 only. With any of the heating methods used for embodiments 1 to 3, the breaking force improved significantly compared to the spot-welding performed in comparative example using the low-frequency power source 6 only, despite the difference in the timing of high-frequency energization performed, namely as preheating, as simultaneous heating, or as post-heating.

The breaking force was found to be much higher than that of the comparative example, on condition that the carbon content of the steel plates 9 falls within the 0.19 to 0.26 weight %.

Embodiment 4

To check the heating effect of the high-frequency power source 8, chromium molybdenum steel 9 was quenched using the same welding equipment 1 for metallic materials in embodiment 1. The chromium molybdenum steel 9 made of SCM435 has the same size as those of the steel plates in embodiment 1. Power was applied from the high-frequency power source 8 for 0.3 sec. at the same frequency as embodiment 1 to perform quenching.

Figure 22:
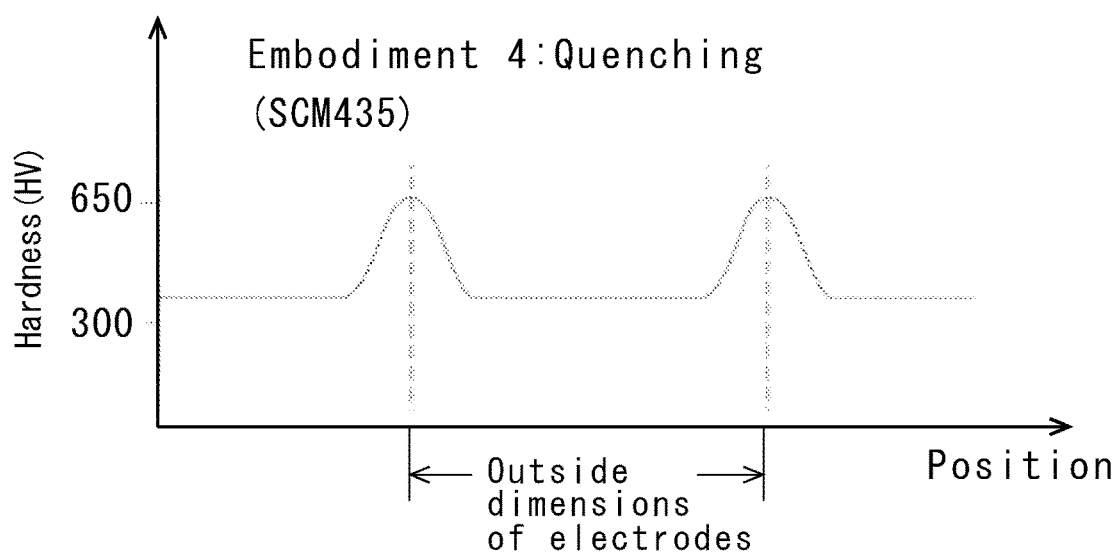
FIG. 22 is a chart illustrating the hardness distribution on the surface of chromium molybdenum steel (SCM435) having undergone quenching in embodiment 4.

FIG. 22 is a chart illustrating the hardness distribution on the surface of chromium molybdenum steel (SCM435) having undergone quenching in embodiment 4. The horizontal axis of the chart represents the position of the electrodes 4 in the direction of the cross-sectional area of the axis on the surface of the chromium molybdenum steel (SCM4359), on which the position of the electrodes 4 and its outside dimension are also shown. The vertical axis of the chart represents Vickers' hardness (HV) value.

As shown in FIG. 22, the hardness of the chromium molybdenum steel (SCM435) in embodiment 4 corresponding to the outermost peripheral region of the electrodes 4 was the highest, approximately 670 HV, which is higher than 370 HV, the hardness of the region not having undergone quenching. It was thus found that the ring-shaped region, namely the outer peripheral region, of the electrodes 4 only, of the chromium molybdenum steel (SCM435), can be quenched by applying power from the high-frequency power source 8.

Embodiment 5

Chromium molybdenum steel (SCM435) having the hardness of approximately 620 HV and having undergone quenching was heated using the same welding equipment 1 for metallic materials used in embodiment 1, and then was tempered. The energization by the high-frequency power source 8 was conducted for 0.3 sec. at the same frequency as embodiment 1 to perform tempering.

Figure 23:
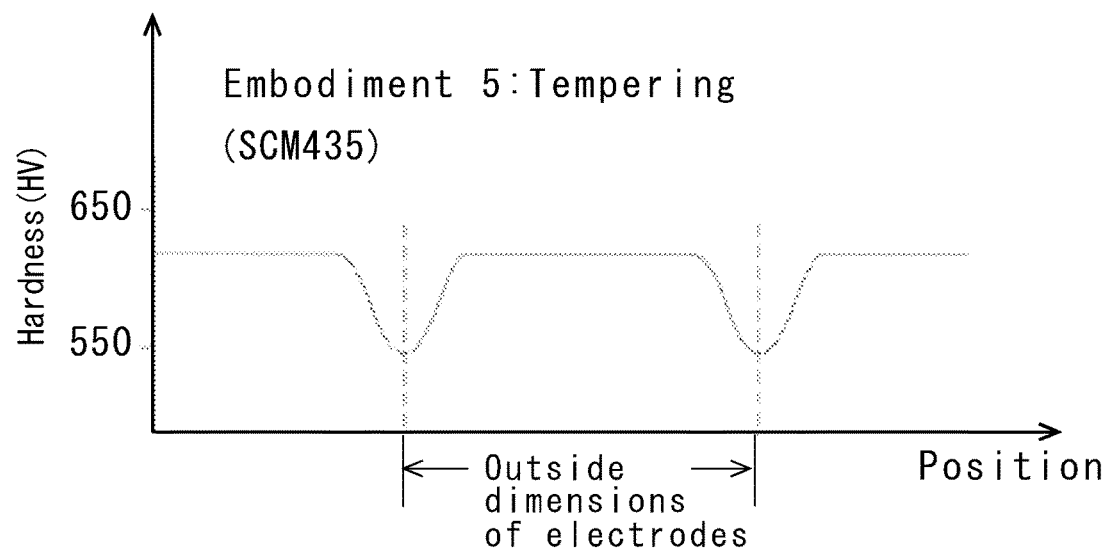
FIG. 23 is a chart illustrating the hardness distribution on the surface of chromium molybdenum steel (SCM435) having undergone tempering in embodiment 5.
Figure 24:
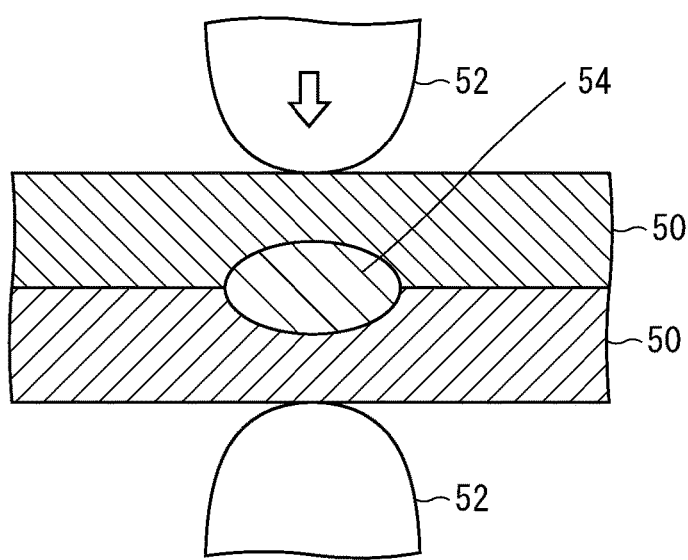
FIG. 24 is a cross-sectional view illustrating the spot welding of steel plates.
Figure 25A:
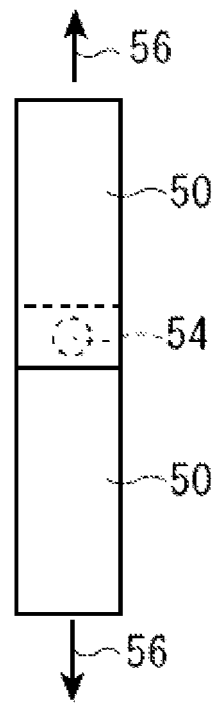
FIGS. 25A and 25B are plan views of the samples used for tensile test for measuring the strength of spot welding of high-tension steel plates.
Figure 25B:
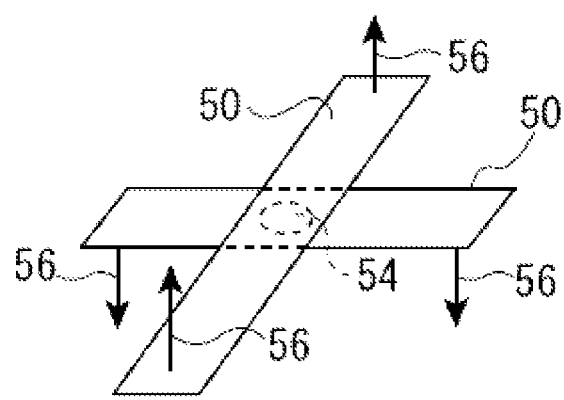

FIG. 23 is a chart illustrating the hardness distribution on the surface of chromium molybdenum steel (SCM435)

having undergone tempering in embodiment 5. The horizontal and vertical axes represent the same items as those in FIG. 23. As shown in FIG. 23, the hardness of the chromium molybdenum steel (SCM435) in embodiment 5 corresponding to the outermost peripheral region of the electrodes 4 was the lowest, approximately 550 HV, which is lower than the hardness observed before tempering was performed (approximately 620 HV). It was thus found that the ring-shaped region, namely the outer peripheral region, of the electrodes 4 only, of chromium molybdenum steel (SCM435), can be tempered by applying power from the high-frequency power source 8.

In addition to the embodiments described above, various modifications of the present invention are possible within the scope of the claims of the invention. Needless to say, all of them are included in the scope of the present invention. The configuration of the gun arm 2 and the electrodes 4, and the capacity of the inductance 5 and the capacitor 7 can be set arbitrarily depending on the type and shape of the work 9.

What is claimed is:

1. A method for spot-welding metallic materials by sandwiching the metallic materials with respective tips of a pair of electrodes opposing to each other and energizing the metallic materials, wherein:
   a spot-welding power source is connected to the pair of electrodes for supplying a spot-welding power to the pair of electrodes to heat and spot-weld a prescribed region of the metallic materials sandwiched by the tips of the pair of electrodes, the spot-welding power being either AC electric power having a first frequency or DC electric power, and
   a high-frequency power source is connected to the pair of electrodes for supplying AC electric power having a second frequency to the pair of electrodes to heat a region of the metallic materials different from the prescribed region,
   the method comprising:
   a first step for heating and spot-welding the prescribed region of the metallic materials sandwiched by the tips of the pair of electrodes by a first energization applying, via said spot-welding power source, the AC electric power having the first frequency or the DC electric power to the pair of electrodes; and
   a second step for heating said region different from the prescribed region in the first step by a second energization applying, via the high-frequency power source, the AC electric power having the second frequency to the pair of electrodes that are maintained at the same position as in the first step,
   wherein the spot-welding power source and the high-frequency power source are respectively connected to the pair of electrodes in parallel,
   wherein the first frequency is lower than the second frequency, and
   wherein the heating time in the first step and that in the second step are independently controlled.

2. The spot-welding method for metallic materials according to claim 1, wherein
   the inside of the prescribed region of the metallic materials is heated by the AC electric power having the first frequency or the DC electric power,
   a proximity of the prescribed region of the metallic materials is heated by the AC electric power having the second frequency, and
   the heating by the spot-welding power source in the first step and that by the high-frequency power source in the second step are independently controlled.

3. The spot-welding method for metallic materials according to claim 2, wherein
   the prescribed region heated by the AC electric power having the first frequency or the DC electric power is an internal area of a circle defined by projecting contacting area of the opposing tips of the pair of electrodes on the metallic materials, and
   the different region heated by the AC electric power having the second frequency is a ring-shaped area along a circumference of said prescribed region of the metallic materials.

4. The spot-welding method for metallic materials according to claim 3, wherein the ring-shaped are undergoes either resistance heating induction heating or both resistance heating and induction heating by the AC electric power having the second frequency.

5. A method for spot-welding metallic materials using a pair of electrodes having respective tips opposing to each other, wherein:
   a spot-welding power source is connected to the pair of electrodes for supplying a spot-welding power to the pair of electrodes to heat and spot-weld a prescribed region of the metallic materials sandwiched by the tips of the pair of electrodes, the spot-welding power being either AC electric power having a first frequency or DC electric power, and
   a high-frequency power source is connected to the pair of electrodes for supplying AC electric power having a second frequency to the pair of electrodes,
   the method comprising:
   a first step for sandwiching the metallic materials with the tips of the pair of electrodes;
   a second step for heating and spot-welding the prescribed region of the metallic materials sandwiched by the tips of the pair of electrodes by applying, via said spot-welding power source, the AC electric power having the first frequency or the DC electric power to the pair of electrodes; and
   a third step for heating the welded prescribed region of the metallic materials or a region different from the prescribed region by applying, via the high-frequency power source, the AC electric power having the second frequency to the pair of electrodes,
   wherein the spot-welding power source and the high-frequency power source are respectively connected to the pair of electrodes in parallel,
   wherein the first frequency is lower than the second frequency, and
   wherein the heating time in the second step and that in the third step are independently controlled.

6. A method for spot-welding metallic materials using a pair of electrodes having respective tips opposing to each other, wherein
   a spot-welding power source is connected to the pair of electrodes for supplying a spot-welding power to the pair of electrodes to heat and spot-weld a prescribed region of the metallic materials sandwiched by the tips of the pair of electrodes, the spot-welding power being either AC electric power having a first frequency or DC electric power, and
   a high-frequency power source is connected to the pair of electrodes for supplying AC electric power having a second frequency to the pair of electrodes, the method comprising;
sandwiching the metallic materials with the tips of the pair of electrodes;
a welding step for heating and spot-welding the prescribed region of the metallic materials sandwiched by the tips of the pair of electrodes by applying, via said spot-welding power source, the AC electric power having the first frequency or the DC electric power to the pair of electrodes; and
a heat-treating step for heating the welded prescribed region of the metallic materials or a region different from the prescribed region by applying, via the high-frequency power source, the AC electric power having the second frequency to the pair of electrodes,
wherein the spot-welding power source and the high-frequency power source are respectively connected to the pair of electrodes in parallel,
wherein the first frequency is lower than the second frequency,
wherein the heating time in the welding step and that in the heat treating step are independently controlled, and
wherein a power of the AC electric power having the second frequency is controlled.

7. The method for spot-welding metallic materials according to claim 6, wherein before ending applying the AC electric power having the first frequency or the DC electric power in the welding step, applying the AC electric power having the second frequency to the pair of electrodes in the heat-treating step starts.

8. A method for spot-welding metallic materials using a pair of electrodes having respective tips opposing to each other, wherein:
a spot-welding power source is connected to the pair of electrodes for supplying a spot-welding power to the pair of electrodes to heat and spot-weld a prescribed region of the metallic materials sandwiched by the tips of the pair of electrodes, the spot-welding power being either AC electric power having a first frequency or DC electric power, and
a high-frequency power source is connected to the pair of electrodes for supplying AC electric power having a second frequency to the pair of electrodes to heat a region of the metallic materials different from the prescribed region,
the method comprising:
sandwiching the metallic materials with the tips of the pair of electrodes;
a welding step for heating the prescribed region of the metallic materials sandwiched by the tips of the pair of electrodes by applying, via said spot-welding power source, the AC electric power having the first frequency or the DC electric power to the pair of electrodes; and
a heating step for heating a region different from the prescribed region of the metallic materials by applying, via the high-frequency power source, the AC electric power having the second frequency to the pair of electrodes,
wherein the spot-welding power source and the high-frequency power source are respectively connected to the pair of electrodes in parallel,
wherein the first frequency is lower than the second frequency,
wherein a heating time in the welding step and that in the heating step are independently controlled, and
wherein the welding step and the heating step at least partially overlap with each other such that the AC electric power having the second frequency in the heating step is superimposed to the AC electric power having the first frequency or the DC electric power applied to the pair of electrodes in the heating step by controlling the heating time and a power of the AC electric power having the second frequency in the heating step.

9. The spot-welding method for metallic materials according to claim 1,
wherein an inductance for blocking current is connected between the spot-welding power source and the pair of electrodes,
wherein a capacitor for blocking current is connected between the high-frequency power source and the pair of electrodes,
wherein the inductance blocks high-frequency current supplied from the high-frequency power source to the pair of electrodes so as to prevent the high-frequency current from flowing into the spot-welding power source, and
wherein the capacitor blocks current supplied from the spot-welding power source to the pair of electrodes so as to prevent the current from the spot-welding power source from flowing into the high-frequency power source.

10. The spot-welding method for metallic materials according to claim 5,
wherein an inductance for blocking current is connected between the spot-welding power source and the pair of electrodes,
wherein a capacitor for blocking current is connected between the high-frequency power source and the pair of electrodes,
wherein the inductance blocks high-frequency current supplied from the high-frequency power source to the pair of electrodes so as to prevent the high-frequency current from flowing into the spot-welding power source, and
wherein the capacitor blocks current supplied from the spot-welding power source to the pair of electrodes so as to prevent the current from the spot-welding power source from flowing into the high-frequency power source.

11. The spot-welding method for metallic materials according to claim 6,
wherein an inductance for blocking current is connected between the spot-welding power source and the pair of electrodes,
wherein a capacitor for blocking current is connected between the high-frequency power source and the pair of electrodes,
wherein the inductance blocks high-frequency current supplied from the high-frequency power source to the pair of electrodes so as to prevent the high-frequency current from flowing into the spot-welding power source, and
wherein the capacitor blocks current supplied from the spot-welding power source to the pair of electrodes so as to prevent the current from the spot-welding power source from flowing into the high-frequency power source.

12. The spot-welding method for metallic materials according to claim 8,
wherein an inductance for blocking current is connected between the spot-welding power source and the pair of electrodes, wherein a capacitor for blocking current is connected between the high-frequency power source and the pair of electrodes, wherein the inductance blocks high-frequency current supplied from the high-frequency power source to the pair of electrodes so as to prevent the high-frequency current from flowing into the spot-welding power source, and wherein the capacitor blocks current supplied from the spot-welding power source to the pair of electrodes so as to prevent the current from the spot-welding power source from flowing into the high-frequency power source.

* * * * *